US010382834B2

(12) United States Patent
Tsukagoshi

(10) Patent No.: US 10,382,834 B2
(45) Date of Patent: Aug. 13, 2019

(54) TRANSMISSION DEVICE, TRANSMISSION METHOD, RECEIVING DEVICE, AND RECEIVING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/781,875

(22) PCT Filed: Nov. 7, 2017

(86) PCT No.: PCT/JP2017/040158
§ 371 (c)(1),
(2) Date: Jun. 6, 2018

(87) PCT Pub. No.: WO2018/096925
PCT Pub. Date: May 31, 2018

(65) Prior Publication Data
US 2018/0376221 A1 Dec. 27, 2018

(30) Foreign Application Priority Data
Nov. 22, 2016 (JP) ................................ 2016-227294

(51) Int. Cl.
*H04N 21/81* (2011.01)
*H04N 21/2362* (2011.01)
(Continued)

(52) U.S. Cl.
CPC ..... *H04N 21/8146* (2013.01); *H04N 21/2358* (2013.01); *H04N 21/2362* (2013.01); *H04N 21/23605* (2013.01); *H04N 21/4884* (2013.01); *H04N 21/8456* (2013.01)

(58) Field of Classification Search
None
See application file for complete search history.

(56) References Cited

U.S. PATENT DOCUMENTS 6,661,467 B1 * 12/2003 Van Der Meer ..... A61K 9/1278 345/601
2009/0154798 A1 6/2009 Mizukura et al.
(Continued)

FOREIGN PATENT DOCUMENTS

JP 2009-94646 A 4/2009
JP 2009-147580 A 7/2009
(Continued)

OTHER PUBLICATIONS

International Search Report dated Feb. 6, 2018 in PCT/JP2017/040158 filed Nov. 7, 2017.
(Continued)

*Primary Examiner* — Omar S Parra
(74) *Attorney, Agent, or Firm* — Oblon, McClelland, Maier & Neustadt, L.L.P.

(57) ABSTRACT

To reduce a processing load on a receiving side upon superimposition of a subtitle graphics data on video data. A video stream with the video data is generated. A subtitle stream with bitmap data obtained by conversion of the subtitle graphics data is generated. A container containing the video stream and the subtitle stream is transmitted. The subtitle stream contains a first segment having a bitmap conversion table with color gamut and/or brightness conversion information. On the receiving side, the bitmap data is merely converted into the subtitle graphics data by means of the bitmap conversion table to that the subtitle graphics data with characteristics conformable to characteristics of superimposition target video data can be easily obtained.

15 Claims, 26 Drawing Sheets

(51) Int. Cl.

| | |
|---|---|
| ***H04N 21/488*** | (2011.01) |
| ***H04N 21/235*** | (2011.01) |
| ***H04N 21/236*** | (2011.01) |
| ***H04N 21/845*** | (2011.01) |

(56) References Cited

U.S. PATENT DOCUMENTS

| | | | |
|---|---|---|---|
| 2010/0247075 | A1 | 9/2010 | Nakata et al. |
| 2013/0222542 | A1 | 8/2013 | Tsukagoshi |
| 2016/0080714 | A1 | 3/2016 | Tsukagoshi |

FOREIGN PATENT DOCUMENTS

| | | | |
|---|---|---|---|
| JP | 2011-30180 | A | 2/2011 |
| WO | WO 2013/031549 | A1 | 3/2013 |
| WO | WO 2014/178286 | A1 | 11/2014 |

OTHER PUBLICATIONS

Extended European Search Report dated Dec. 19, 2018 in corresponding European Patent Application No. 17873726.8, 7 pages.

"Digital Video Broadcasting (DVB); Subtitling Systems, DVB TM-SUB0145: First Working Draft", ETSI EN 300 743 V1 .6.1 (2016-XX), XP17852288, Sep. 10, 2016, pp. 1-67.

"Digital Video Broadcasting (DVB); Subtitling Systems; DVB TM-SUB0145r23: Working Draft, Sep. 18, 2017, Clean version of r22", ETSI EN 300 743 V1.6.1 (2017-XX), XP17854599A, pp. 1-81.

Ikuo Tsukagoshi, "Proposal for Rendering Subtitles on UHD HDR Video", Sony, XP17853119, Nov. 10, 2016, 7 pages.

* cited by examiner

FIG. 3

CONVERSION TARGET EXAMPLES OTHER THAN CONVERSION FROM bitmap TO Y/CbCr IN CONVERSION TABLE

| SUBTITLE GRAPHICS DATA | SUPERIMPOSITION TARGET VIDEO DATA | CONVERSION TARGET |
|---|---|---|
| SDR | SDR | COLOR GAMUT |
| SDR | HDR | COLOR GAMUT, BRIGHTNESS |
| HDR | SDR | COLOR GAMUT, BRIGHTNESS |
| HDR | HDR | --- |

FIG. 4

(1) CASE WHERE SUBTITLE GRAPHICS DATA BEFORE CONVERSION INTO BITMAP DATA IS SDR AND SUPERIMPOSITION TARGET VIDEO DATA IS SDR (CASE WHERE SAME COLOR GAMUT IS APPLIED)
(2) CASE WHERE SUBTITLE GRAPHICS DATA BEFORE CONVERSION INTO BITMAP DATA IS SDR AND SUPERIMPOSITION TARGET VIDEO DATA IS SDR (CASE WHERE DIFFERENT TYPES OF COLOR GAMUT ARE APPLIED)
(3) CASE WHERE SUBTITLE GRAPHICS DATA BEFORE CONVERSION INTO BITMAP DATA IS SDR AND SUPERIMPOSITION TARGET VIDEO DATA IS HDR
(4) CASE WHERE SUBTITLE GRAPHICS DATA BEFORE CONVERSION INTO BITMAP DATA IS HDR AND SUPERIMPOSITION TARGET VIDEO DATA IS SDR
(5) CASE WHERE SUBTITLE GRAPHICS DATA BEFORE CONVERSION INTO BITMAP DATA IS HDR AND SUPERIMPOSITION TARGET VIDEO DATA IS HDR

FIG. 5

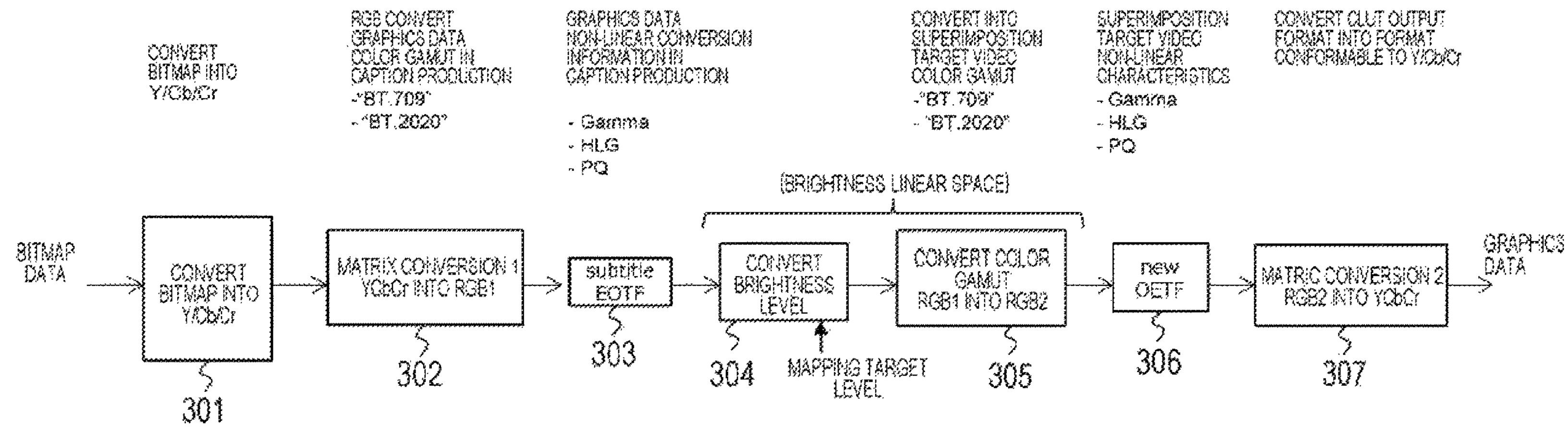

| | | | | | | | |
|---|---|---|---|---|---|---|---|
| (1) | PROCESSING | --- | --- | --- | --- | --- | --- |
| (2) | PROCESSING | PROCESSING | --- | --- | PROCESSING | --- | PROCESSING |
| (3) | PROCESSING | PROCESSING | SDR REVERSE CONVERSION PROCESSING | CONVERSION TO BRING PREDETERMINED SDR BRIGHTNESS INTO REFERENCE HDR MAPPING LEVEL | PROCESSING | HDR CONVERSION PROCESSING | PROCESSING |
| (4) | PROCESSING | PROCESSING | HDR REVERSE CONVERSION PROCESSING | CONVERSION TO BRING PREDETERMINED HDR BRIGHTNESS INTO REFERENCE SDR MAPPING LEVEL | PROCESSING | SDR CONVERSION PROCESSING | PROCESSING |
| (5) | PROCESSING | --- | --- | --- | --- | --- | --- |

(1) CASE WHERE SUBTITLE GRAPHICS DATA AFTER CONVERSION FROM BITMAP DATA IS SDR AND COLOR GAMUT IS NARROW (e.g., BT.709)

(2) CASE WHERE SUBTITLE GRAPHICS DATA AFTER CONVERSION FROM BITMAP DATA IS SDR AND COLOR GAMUT IS WIDE (e.g., BT.2020)

(3) CASE WHERE SUBTITLE GRAPHICS DATA AFTER CONVERSION FROM BITMAP DATA IS HDR

FIG. 9

| Syntax | No. of Bits | Format |
|---|---|---|
| CLUT_definition_Segment( ) { | | |
| sync_byte | 8 | bslbf |
| segment_type | 8 | bslbf |
| page_id | 16 | bslbf |
| segment_length | 16 | bslbf |
| CLUT_id | 8 | uimsbf |
| CLUT_version_number | 4 | uimsbf |
| reserved | 4 | bslbf |
| while ( processed_length < segment_length ) { | | |
| CLUT_entry_id | 8 | uimsbf |
| 2-bit/entry_CLUT_flag | 1 | uimsbf |
| 4-bit/entry_CLUT_flag | 1 | bslbf |
| 8-bit/entry_CLUT_flag | 1 | bslbf |
| reserved | 3 | bslbf |
| output_range_type | 2 | bslbf |

FIG. 10

CLUT definition segment Syntax (CONTINUED)

| Syntax | No. of Bits | Format |
|---|---|---|
| if (output_range_type == '0') { | | |
| Y-value | 6 | uimsbf |
| Cr-value | 4 | uimsbf |
| Cb-value | 4 | uimsbf |
| T-value | 2 | uimsbf |
| } else if (output_range_type == '1') { | | |
| Y-value | 8 | uimsbf |
| Cr-value | 8 | uimsbf |
| Cb-value | 8 | uimsbf |
| T-value | 8 | uimsbf |
| } else if (output_range_type == '2') { | | |
| Y-value | 10 | uimsbf |
| Cr-value | 10 | uimsbf |
| Cb-value | 10 | uimsbf |
| T-value | 10 | uimsbf |
| } else { | | |
| Y-value | 12 | uimsbf |
| Cr-value | 12 | uimsbf |
| Cb-value | 12 | uimsbf |
| T-value | 12 | uimsbf |
| } | | |
| } | | |
| } | | |

FIG. 11

| | |
|---|---|
| CLUT_id | INDICATE CLUT INFORMATION IDENTIFICATION ID |
| output_range_type | INDICATE bit depth OF EACH COMPONENT OF CLUT OUTPUT |
| "0" | Y/Cb/Cr/T TO 6:4:4:2 |
| "1" | Y/Cb/Cr/T TO 8:8:8:8 |
| "2" | Y/Cb/Cr/T TO 10:10:10:10 |
| "3" | Y/Cb/Cr/T TO 12:12:12:12 |

FIG. 12

Syntax of "Rendering_guide_segment"
(IDENTIFICATION METHOD INCLUDING SUPERIMPOSITION TARGET video CONDITION)

| Syntax | Size | Type |
|---|---|---|
| Rendering_guide_segment(){ | | |
| | | |
| | | |
| Header (Segment management elements) | | |
| | | |
| | | |
| number_of_rendering_option_sets | 8 | |
| for (k = 0; k < number_of_rendering_option_sets ; k++ ){ | | |
| CLUT_id | 8 | uimsbf |
| subtitle_color_gamut_information | 8 | uimsbf |
| subtitle_dynamic_range_information | 8 | uimsbf |
| video_color_gamut_information | 8 | uimsbf |
| video_dynamic_range_information | 8 | uimsbf |
| } | | |
| } | | |

FIG. 13

Syntax of "Rendering_guide_segment"
(IDENTIFICATION METHOD NOT INCLUDING SUPERIMPOSITION TARGET video CONDITION)

| Syntax | Size | Type |
|---|---|---|
| Rendering_guide_segment(){ | | |
| | | |
| | | |
| Header (Segment management elements) | | |
| | | |
| | | |
| | | |
| number_of_rendering_option_sets | 8 | |
| for (k = 0; k < number_of_rendering_option_sets ; k++ ){ | | |
| CLUT_id | 8 | uimsbf |
| subtitle_color_gamut_information | 8 | uimsbf |
| subtitle_dynamic_range_information | 8 | uimsbf |
| } | | |
| } | | |

FIG. 14 number_of_rendering_option_sets (8bits)
INDICATE NUMBER OF PIECES OF CLUT INFORMATION.

CLUT_id
INDICATE CLUT INFORMATION IDENTIFICATION ID.

subtitle_color_gamut_information (8bits)
INDICATE COLOR GAMUT OF SUBTITLE GRAPHICS DATA.
MEANING OF VALUE IS SIMILAR TO THAT OF colour_primaries OF HEVC STANDARD.

subtitle_dynamic range_information (8bits)
INDICATE TYPE OF DYNAMIC RANGE OF SUBTITLE GRAPHICS DATA.
MEANING OF VALUE IS SIMILAR TO THAT OF transfer_characteristics OF HEVC STANDARD.

video_color_gamut_information (8bits)
INDICATE COLOR GAMUT OF SUPERIMPOSITION TARGET VIDEO DATA.
MEANING OF VALUE IS SIMILAR TO THAT OF colour_primaries OF HEVC STANDARD.

video_dynamic_range_information (8bits)
INDICATE TYPE OF DYNAMIC RANGE OF SUPERIMPOSITION TARGET VIDEO DATA.
MEANING OF VALUE IS SIMILAR TO THAT OF transfer_characteristics OF HEVC STANDARD.

FIG. 15

VARIATION OF BITMAP CONVERSION TABLE IN SUBTITLE TRANSFER
(CASE OF INCLUDING video INFORMATION IN CLUT TRANSFER LOOP)

| CLUT_id | 1 | 2 | 3 | 4 | 5 |
|---|---|---|---|---|---|
| subtilte_dynamic_range_information | SDR | SDR | SDR | HDR | HDR |
| subtitle_color_gamut_information | 709 | 709 | 709 | 2020 | 2020 |
| video_dynamic_range_information | SDR | SDR | HDR | SDR | HDR |
| video_color_gamut_information | 709 | 2020 | 2020 | 2020 | 2020 |
| Table Data | | | | | |

FIG. 16

VARIATION OF BITMAP CONVERSION TABLE IN SUBTITLE TRANSFER
(CASE OF NOT INCLUDING video INFORMATION IN CLUT TRANSFER LOOP)

| CLUT_id | 1 | 2 | 3 |
|---|---|---|---|
| subtitle_dynamic_range_information | SDR | SDR | HDR |
| subtitle_color_gamut_information | 709 | 2020 | 2020 |
| Table Data | | | |

200

RECEIVER CLUT SELECTION DECISION (CASE OF NOT INCLUDING video INFORMATION IN CLUT TRANSFER LOOP)

(CASE OF INCLUDING video INFORMATION IN CLUT TRANSFER LOOP)

(CASE OF NOT INCLUDING video INFORMATION IN CLUT TRANSFER LOOP)

VARIATION OF BITMAP CONVERSION TABLE IN SUBTITLE TRANSFER

| CLUT_type | 0 | 1 | 2 | 3 |
|---|---|---|---|---|
| TARGETED dynamic_range | HDR (HLG) | HDR (PQ) | SDR | SDR |
| TARGETED color_gamut | 2020 | 2020 | 2020 | 709 |
| Table Data | | | | |

200A (CASE OF NOT INCLUDING video INFORMATION IN CLUT TRANSFER LOOP)

FIG. 27

DEFINE NEW ELEMENT 'CLUT_type' IN PART OF DDS (TYPICAL Segment) (NO. 1)

| Syntax | No. of Bits | Format |
|---|---|---|
| Display_definition_segment() { | | |
| sync_byte | 8 | uimsbf |
| segment_type | 8 | uimsbf |
| page_id | 16 | |
| segment_length | 16 | uimsbf |
| dds_version_number | 4 | uimsbf |
| display_window_flag | 1 | bslbf |
| CLUT_type | 2 | uimsbf |
| reserved | 1 | bslbf |
| display_width | 16 | uimsbf |
| display_height | 16 | uimsbf |
| if( display_window_flag == 1) { | | |
| display_window_horizontal_position_minimum | 16 | uimsbf |
| display_window_horizontal_position_maximum | 16 | uimsbf |
| display_window_vertical_position_minimum | 16 | uimsbf |
| display_window_vertical_position_maximum | 16 | uimsbf |
| } | | |
| } | | |

FIG. 28

| CLUT_type (2bits) | INDICATE DYNAMIC RANGE/COLOR GAMUT OF PIXEL AFTER CONVERSION ACCORDING TO CLUT TRANSMITTED IN CDS. |
|---|---|
| '00' | DYNAMIC RANGE HDR(HLG), COLOR GAMUT 2020 |
| '01' | DYNAMIC RANGE HDR(PQ), COLOR GAMUT 2020 |
| '10' | DYNAMIC RANGE SDR, COLOR GAMUT 2020 |
| '11' | DYNAMIC RANGE SDR, COLOR GAMUT 709 |

TS tree

FIG. 30

DEFINE NEW ELEMENT 'CLUT_type' IN PART OF CDS (TYPICAL Segment) (NO. 2)

| Syntax | No. of Bits | Format |
|---|---|---|
| CLUT_definition_Segment( ) { | | |
| sync_byte | 8 | bslbf |
| segment_type | 8 | bslbf |
| page_id | 16 | bslbf |
| segment_length | 16 | bslbf |
| CLUT_id | 8 | uimsbf |
| CLUT_version_number | 4 | uimsbf |
| CLUT_type | 2 | uimsbf |
| reserved | 4 | bslbf |
| while ( processed_length < segment_length ) { | | |
| CLUT_entry_id | 8 | uimsbf |
| 2-bit/entry_CLUT_flag | 1 | uimsbf |
| 4-bit/entry_CLUT_flag | 1 | bslbf |
| 8-bit/entry_CLUT_flag | 1 | bslbf |
| reserved | 3 | bslbf |
| output_range_type | 2 | bslbf |

FIG. 31

CLUT definition segment Syntax (CONTINUED)

| Syntax | No. of Bits | Format |
|---|---|---|
| if (output_range_type == '0') { | | |
| Y-value | 6 | uimsbf |
| Cr-value | 4 | uimsbf |
| Cb-value | 4 | uimsbf |
| T-value | 2 | uimsbf |
| } else if (output_range_type == '1') { | | |
| Y-value | 8 | uimsbf |
| Cr-value | 8 | uimsbf |
| Cb-value | 8 | uimsbf |
| T-value | 8 | uimsbf |
| } else if (output_range_type == '2') { | | |
| Y-value | 10 | uimsbf |
| Cr-value | 10 | uimsbf |
| Cb-value | 10 | uimsbf |
| T-value | 10 | uimsbf |
| } else { | | |
| Y-value | 12 | uimsbf |
| Cr-value | 12 | uimsbf |
| Cb-value | 12 | uimsbf |
| T-value | 12 | uimsbf |
| } | | |
| } | | |
| } | | |

TRANSMISSION DEVICE, TRANSMISSION METHOD, RECEIVING DEVICE, AND RECEIVING METHOD

TECHNICAL FIELD

The present technology relates to a transmission device, a transmission method, a receiving device, and a receiving method. Specifically, the present technology relates to a transmission device configures to transmit subtitle (caption) information by bitmap data and the like.

BACKGROUND ART

Typically, in, e.g., a digital video broadcasting (DVB) or the like, the operation of converting subtitle graphics data into bitmap data and transmitting the bitmap data has been performed (see, e.g., Patent Document 1).

CITATION LIST

Patent Document

Patent Document 1: Japanese Patent Application Laid-Open No. 2011-030180

SUMMARY OF THE INVENTION

Problems to be Solved by the Invention

Typically, when each of video data and subtitle graphics data is transferred in a separate stream, there is no significant difference in color gamut or brightness between both types of data. Thus, synthesis is performed without special attention upon superimposition.

For example, in a case where the color gamut of the video data is wide color gamut (e.g., conformable to ITU-R Rec Bt. 2020) and the color gamut of the subtitle graphics data is narrow color gamut (e.g., sRGB), superimposition needs to be performed after the color gamut of the subtitle graphics data has become conformable to the color gamut of the video data for maintaining video image quality at high quality.

Moreover, in, e.g., a case where the video data is produced in a high dynamic range (HDR) and the subtitle graphics data is produced in a standard level of the dynamic range (SDR), superimposition needs to be performed after the subtitle graphics data has become conformable to a dynamic range region of the video data for maintaining the video image quality at high quality.

An object of the present technology is to reduce a processing load on a receiving side upon superimposition of subtitle graphics data on video data.

Solutions to Problems

A concept of the present technology lies in a transmission device including:

a video encoding unit configured to generate a video stream with video data;

a subtitle encoding unit configured to generate a subtitle stream with bitmap data obtained by conversion of subtitle graphics data; and a transmission unit configured to transmit a container containing the video stream and the subtitle stream, in which the subtitle stream contains a first segment having a bitmap conversion table with color gamut and/or brightness conversion information.

In the present technology, the video stream with the video data is generated by the video encoding unit. By the subtitle encoding unit, the subtitle stream with the bitmap data obtained by conversion of the subtitle graphics data is generated. By the transmission unit, the container containing the video stream and the subtitle stream is transmitted.

The subtitle stream contains the first segment having the bitmap conversion table with the color gamut and/or brightness conversion information. For example, the first segment may be a CLUT definition segment. Furthermore, for example, the first segment may have multiple bitmap conversion tables different from each other in the conversion information.

As described above, in the present technology, the subtitle stream contains the first segment having the bitmap conversion table with the color gamut and/or brightness conversion information. Thus, on a receiving side, the bitmap data is merely converted into the subtitle graphics data by means of the bitmap conversion table so that the subtitle graphics data with characteristics conformable to characteristics of superimposition target video data (e.g., display video data) can be easily obtained. Consequently, a processing load on the receiving side can be reduced.

Note that in the present technology, the subtitle stream the subtitle stream may further contain a second segment having bitmap conversion table conformability information, for example. In this case, for example, the conformability information may be characteristic information regarding the subtitle graphics data before conversion into the bitmap data and superimposition target video data or characteristic information regarding the subtitle graphics data after conversion from the bitmap data.

Moreover, in this case, the second segment may be, for example, a rendering guide segment or a display definition segment. Furthermore, in this case, for example, identical identification information may be added to as associated with each of the bitmap conversion table contained in the first segment and the characteristic information corresponding to the bitmap conversion table and contained in the second segment.

The subtitle stream further contains, as described above, the second segment having the confirmability information regarding the bitmap conversion table contained in the first segment so that on the receiving side, a bitmap conversion table which should be used can be easily and suitably selected from multiple bitmap conversion tables, for example.

Furthermore, in the present technology, for example, the first segment further may have bitmap conversion table conformability information. In this case, the conformability information may be, for example, characteristic information regarding the subtitle graphics data after conversion from the bitmap data.

Furthermore, another concept of the present technology lies in a receiving device including:

a receiving unit configured to receive a container containing a video stream with video data and a subtitle stream with bitmap data obtained by conversion of subtitle graphics data, in which the subtitle stream contains a first segment having a bitmap conversion table with color gamut and/or brightness conversion information, and a control unit is further provided, the control unit being configured to control processing of decoding the video stream to obtain the video data, processing of decoding the subtitle stream to obtain the bitmap data and the bitmap conversion table, processing of converting the bitmap data into the subtitle graphics data by means of the bitmap conversion table, and processing of superimposing the subtitle graphics data on the superimposition target video data obtained on the basis of the video data.

In the present technology, the container containing the video stream with the video data and the subtitle stream with the bitmap data obtained by conversion of the subtitle graphics data is received by the receiving unit. The subtitle stream contains the first segment having the bitmap conversion table with the color gamut and/or brightness conversion information.

The processing of decoding the video stream to obtain the video data and the processing of decoding the subtitle stream to obtain the bitmap data and the bitmap conversion tables are performed. The processing of converting the bitmap data into the subtitle graphics data by means of the bitmap conversion table and the processing of superimposing the subtitle graphics data on the display video data (e.g., display video data) obtained on the basis of the video data are performed.

For example, the first segment may have multiple bitmap conversion tables different from each other in the conversion information. The multiple bitmap conversion tables may correspond to multiple different character ratios of the subtitle graphics data, or may correspond to multiple different characteristics of the subtitle graphics data and the video data. In the processing of converting the bitmap data into the subtitle graphics data, a bitmap conversion table or the multiple bitmap conversion tables conformable to characteristics of the subtitle graphics data before conversion into the bitmap data and the display video data may be selectively used.

As described above, in the present technology, in the processing of converting the bitmap data into the subtitle graphics data, the bitmap conversion table contained in the first segment of the subtitle stream and containing the color gamut and/or brightness conversion information is used. Thus, the subtitle graphics data with the characteristics conformable to the characteristics of the superimposition target video data can be easily obtained, and the processing load can be reduced.

Note that, in the present technology, for example, the subtitle stream may further contain a second segment having characteristic information corresponding to each of the multiple bitmap conversion tables, and in the processing of converting the bitmap data into the subtitle graphics data, the bitmap conversion table conformable to the characteristic of the superimposition target video data may be selected on the basis of the characteristic information contained in the second segment and corresponding to each of the multiple bitmap conversion tables. With this configuration, the bitmap conversion table which should be used can be easily and suitable selected from the multiple bitmap conversion tables.

Furthermore, in the present technology, for example, the first segment may have a single bitmap conversion table, and the control unit may further control post processing of adjusting a characteristic of the subtitle graphics data obtained by conversion according to the bitmap change table to the superimposition target video data when the characteristic is not conformable to the superimposition target video data. With this configuration, the subtitle graphics data with the characteristics conformable to those of the superimposition target video data can be superimposed on the superimposition target video data.

Furthermore, in the present technology, for example, the first segment may have a single bitmap conversion table, and the control unit may hold characteristic conformability information regarding the single bitmap conversion table, the characteristic conformability information being shared with a transmission side. With this configuration. The control unit can easily recognize the characteristics of the subtitle graphics data obtained by conversion according to the bitmap conversion table.

EFFECTS OF THE INVENTION

According to the present technology, the processing load on the receiving side upon superimposition of the subtitle graphics data on the video data can be reduced. Note that the advantageous effects described in the present specification are set forth merely as examples, and are not limited. Moreover, additional advantageous effects may be provided.

BRIEF DESCRIPTION OF DRAWINGS

FIG. 3 is a table of conversion target examples other than conversion from bitmap data into subtitle graphics data (Y/CbCr) in a bitmap conversion table.

FIG. 4 is a table for describing bitmap conversion table information in the case of including video information in a CLUT transfer loop.

FIG. 5 is a table for describing details of conversion functions (conversion functions of the bitmap conversion table) necessary on a receiving side.

FIG. 9 is a table (1/2) of a structure example of a CLUT definition segment. (CDS).

FIG. 10 is a table (2/2) of the structure example of the CLUT definition segment (CDS).

FIG. 11 is a table of contents of main information in the structure example of the CLUT definition segment (CDS).

FIG. 12 is a table of a structure example of a rendering guide segment (RGS) in the case of including the video information in the CLUT transfer loop.

FIG. 13 is a table of the structure example of the rendering guide segment (RGS) in the case of not including the video information in the CLUT transfer loop.

FIG. 14 is a table of contents of main information in the structure example of the rendering guide segment (RGS).

FIG. 15 is a table of a variation of the bitmap conversion table in the case of including the video information in the CLUT transfer loop.

FIG. 16 is a table of a variation of the bitmap conversion table in the case of not including the video information in the CLUT transfer loop.

FIG. 27 is a table of a structure example of a display definition segment (DDS).

FIG. 28 is a table of contents of main information in the structure example of the display definition segment (DDS).

FIG. 30 is a table (1/2) of a structure example of the CLUT definition segment (CDS).

FIG. 31 is a table (2/2) of the structure example of the CLUT definition segment (CDS).

MODE FOR CARRYING OUT THE INVENTION

Hereinafter, the mode (hereinafter, referred to as an "embodiment") for carrying out the invention will be described. Note that description will be made in the following order:

1. Embodiment
2. Variations

1. EMBODIMENT

[Configuration Example of Transmission/Receiving System]

Figure 1:
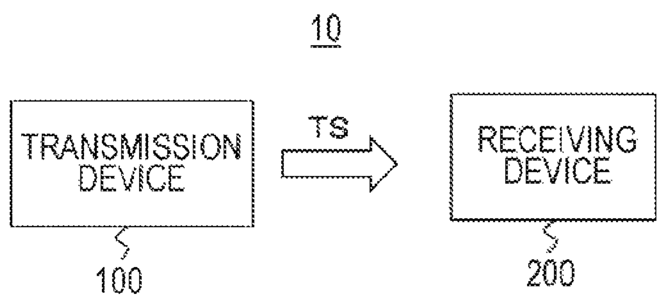
FIG. 1 is a block diagram of a configuration example of a transmission/receiving system as an embodiment.

FIG. 1 illustrates a configuration example of a transmission/receiving system 10 as the embodiment. The transmission/receiving system 10 includes a transmission device 100 and a receiving device 200.

The transmission device 100 is configured to generate a MPEG2 transport stream TS as a container, thereby transmitting the transport stream TS with the transport stream TS being on a broadcast wave or a net packet. The transport stream TS contains a video stream with video data (image data).

Moreover, the transport stream TS contains a subtitle stream having, as subtitle data (caption data), bitmap data obtained by conversion of subtitle graphics data. The subtitle data contains a first segment having a bitmap conversion table with color gamut and/or brightness, the bitmap conversion table having both types of conversion information in the present embodiment. In the present embodiment, the first segment is a CLUT definition segment, and has one or more bitmap conversion tables.

With this configuration, the bitmap data is, on a receiving side, merely converted into the subtitle graphics data by means of the bitmap conversion table so that the subtitle graphics data with characteristics conformable to characteristics of superimposition target video data (e.g., display video data) can be easily obtained. Thus, a processing load on the receiving side can be reduced.

Moreover, the subtitle stream further contains a second a element having bitmap conversion table conformability information. This conformability information is characteristic information regarding the subtitle graphics data before conversion into the bitmap data and the superimposition target video data or characteristic information regarding the subtitle graphics data after conversion from the bitmap data. In the present embodiment, the second segment is, for example, a newly-defined rendering guide segment.

In this case, the same identification information is added to and associated with each of the bitmap conversion table contained in the first segment and the characteristic information contained corresponding to this bitmap conversion table in the second segment. With this configuration, the bitmap conversion table which should be used can be easily and suitably selected from a predetermined number of bitmap conversion tables on the receiving side.

The receiving device 200 is configured to receive the transport stream TS transmitted from the transmission device 100. The receiving device 203 obtains video data by decoding of a video stream. Moreover, the receiving device 200 is configured to decode the subtitle stream to obtain the bitmap data and the bitmap conversion table contained in the first segment, thereby converting the bitmap data into the subtitle graphics data by means of the bitmap conversion table.

In this case, in a case where there are multiple bitmap conversion tables with the conversion information, the bitmap conversion table conformable to the characteristics of the superimposition target video data among the multiple bitmap conversion tables is selectively used in the processing or converting the bitmap data into the subtitle graphics data. In this case, the bitmap conversion table conformable to the characteristics of the superimposition target video data is selected on the basis of the characteristic information corresponding to each of the multiple bitmap conversion tables contained in the second segment.

The receiving device 200 is configured to superimpose the subtitle graphics data obtained by conversion of the bitmap data on the superimposition target video data (e.g., the display video data). In this case, the superimposition target video data may induce not only the video data itself transmitted from a transmission side, but also the video data subjected to color gamut or dynamic range conversion processing if needed. By the video data on which the subtitle graphics data is superimposed as described above, an image with subtitles is displayed on a monitor.

"Configuration Example of Transmission Device"

Figure 2:
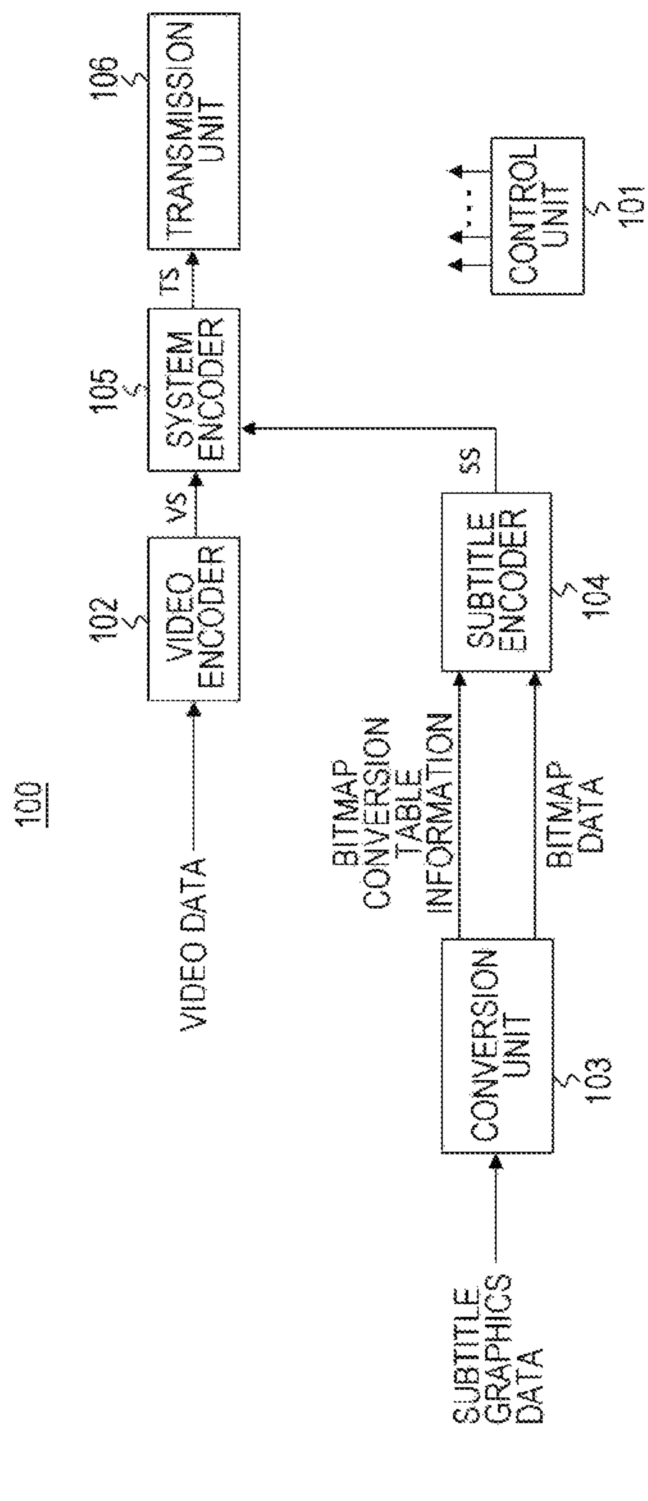
FIG. 2 is a diagram of a configuration example of a transmission device.

FIG. 2 illustrates a configuration example of the transmission device 100. The transmission device 100 has a control unit 101, a video encoder 102, a conversion unit 103, a subtitle encoder 104, a system encoder 105, and a transmission unit.

The control unit 101 includes a central processing unit (CPU), and is configured to control operation of each unit of the transmission device 100 on the basis of a control program. The video encoder 102 is configured to perform encoding, such as MPEG4-SVC or HEVC, for the video data, thereby generating a video stream (a PES stream) VS containing the encoded video data, for example.

The video data described herein is standard dynamic range (SDR) or high dynamic range (HDR) data with SDR or HDR photoelectric conversion characteristics. The video encoder 102 inserts the video data characteristic information, i.e., meta information such as the color gamut or dynamic range information, into a video usability information (VUI) region of a SPS NAL unit of an access unit (AU).

The conversion unit 103 is configured to convert the subtitle graphics data into the bitmap data. The subtitle graphics data described herein is SDR or HDR data with SDR or HDR photoelectric conversion characteristics. The conversion unit 103 refers to an HDR or SDR level assumed as being necessary on the receiving side, thereby outputting, together with the bitmap data, the information regarding one or more bitmap conversion tables.

The bitmap conversion table described herein is a bitmap conversion table containing the color gamut and/or brightness conversion information. That is, this bitmap conversion table is not for merely converting the bitmap data into the subtitle graphics data, but for also converting the color gamut or the brightness such that such color gamut or brightness is conformable to the color gamut or dynamic range of the superimposition target video data (e.g., the display video data).

FIG. 3 illustrates conversion target examples other than conversion from the bitmap data into the subtitle graphics data (YCbCr) in the bitmap conversion table. In a case where the subtitle graphics data before conversion into the bitmap data is SDR and the superimposition target video data is SDR, the color gamut may be taken as the other conversion targets. For example, the color gamut is taken as the conversion target when the color gamut of the subtitle graphics data is BT.709 and the color gamut of the superimposition target video data is BT.2020.

Moreover, in a case where the subtitle graphics data before conversion into the bitmap data is SDR and the superimposition target video data is HDR, the color gamut and the brightness may be taken as the conversion targets. Further, in a case where the subtitle graphics data before conversion info the bitmap data is HDR and the superimposition target video data is SDR, the color gamut and the brightness may be taken as the conversion targets. Note that in a case where the subtitle graphics data before conversion into the bitmap data is HDR and the superimposition target video data is HDR, the common color gamut and dynamic range are applied, and therefore, there is no available conversion target.

In the present embodiment, the conversion unit 103 outputs bitmap conversion table information. For this bitmap conversion table information, (A) the case of including video information in a CLUT transfer loop and (B) the case of not including the video information in the CLUT transfer loop are conceivable. Hereinafter, each or the cases (A), (B) will be described.

First, (A) the case of including the video information in the CLUT transfer loop will be described. The conversion unit 103 outputs, for example, the bitmap conversion table information used in each of cases (1) to (5) of FIG. 4. Note that in practice, not all types of bitmap conversion table information but only the bitmap conversion table information corresponding to the color gamut/dynamic range of the subtitle graphics data before conversion into the bitmap data, i.e., in a subtitle produced state, is output.

The case (1) is a case where the subtitle graphics data before conversion into the bitmap data is SDR and the superimposition target video data as SDR (a case where the same color gamut is applied). The case (2) is a case where the subtitle graphics data before conversion into the bitmap data is SDR and the superimposition target video data is SDR (a case where different types of color gamut are applied).

The case (3) is a case where the subtitle graphics data before conversion into the bitmap data is SDR and the superimposition target video data is HDR. The case (4) is a case where the subtitle graphics data before conversion into the bitmap data is HDR and the superimposition target video data is SDR. The case (5) is a case where the subtitle graphics data before conversion into the bitmap data is HDR and the superimposition target video data is HDR.

Details of necessary conversion functions and therefore conversion functions of the bitmap conversion table in each of the cases (1) to (5) will be described with reference to FIG. 5. The most necessary conversion functions on the receiving side are the following first to seventh conversion functions. Processing in these conversion functions is basically processing independent for each pixel.

The first conversion function 301 is the function of converting the bitmap data into the subtitle graphics data. The second conversion function 302 is the function of converting the domain of the subtitle graphics data from YCbCr into RGB1, the subtitle graphics data having been converted from the bitmap data. The third conversion function 303 is the function of applying the photoelectric conversion characteristics to perform photoelectric conversion for bringing, into a brightness linear space, the subtitle graphics data converted from the bitmap data.

The fourth conversion function 304 is the function of converting a brightness level for solving a disadvantage due to a difference in the dynamic range between the subtitle graphics data converted from the bitmap data and the superimposition target video data. The fifth conversion function 305 is the function of performing color gamut conversion (RGB1 into RGB2) such that the color gamut of the subtitle graphics data converted from the bitmap data is conformable to the color gamut of the superimposition target video data.

The sixth conversion function 306 is the function of applying the same photoelectric conversion characteristics as those of the superimposition target video data to the subtitle graphics data in the brightness linear space, thereby performing photoelectric conversion. The seventh conversion function 307 is the function of converting the domain of the subtitle graphics data from RGB2 into YCbCr.

In the case (1), only the first conversion function 301 is necessary. In this case, the bitmap data is converted into the subtitle graphics date by the first conversion function 301, and the resultant graphics data is directly taken as output graphics data. In this case, any of the subtitle graphics data before conversion into the bitmap data and the superimposition target video data is SDR and has the same color gamut, and therefore, the second conversion function 302 to the seventh conversion function 307 are bypassed. This conversion processing is exactly the same as processing performed in traditional legacy broadcasting.

In the case (2), the first conversion function 301, the second conversion function 302, the fifth conversion function 305, and the seventh conversion function 307 are necessary. In this case, the bitmap data is converted into the subtitle graphics data by the first conversion function 301.

The resultant subtitle graphics data is converted from the YCbCr domain into the RGB1 domain by the second conversion function 302.

The subtitle graphics data converted into the RGBa domain is, by the fifth conversion function 305, converted such that the color gamut thereof is conformable to the color gamut of the superimposition target video data. For example, a subtitle graphics data color gamut of BT.709 is converted conformable to a superimposition target video data color gamut of BT.2020.

The subtitle graphics data subjected to color gamut conversion is converted from the RGB2 domain info YCbCr by the seventh conversion function 307, and the resultant graphics data is taken as the output graphics data. In this case, any of the subtitle graphics data before conversion into the bitmap data and the superimposition target video data is SDR, and therefore, the third conversion function 303, the fourth conversion function 304, and the sixth conversion function 306 are bypassed.

In the case (3), all of the first conversion function 301 to the seventh conversion function 307 are necessary. In this case, the bitmap data is converted into the subtitle graphics data by the first conversion function 301. The resultant subtitle graphics data is converted from the YCbCr domain into the RGB1 domain by the second conversion function 302.

The subtitle graphics data converted into the RGB1 domain is photoelectrically converted by application of the SDR photoelectric conversion characteristics, and is brought into the brightness linear space by the third conversion function 303. The brightness level of the subtitle graphics data in the brightness linear space is converted by the fourth conversion function 304. In this case, conversion is performed such that a predetermined SDR brightness level reaches a reference HDR mapping level.

Figure 6:
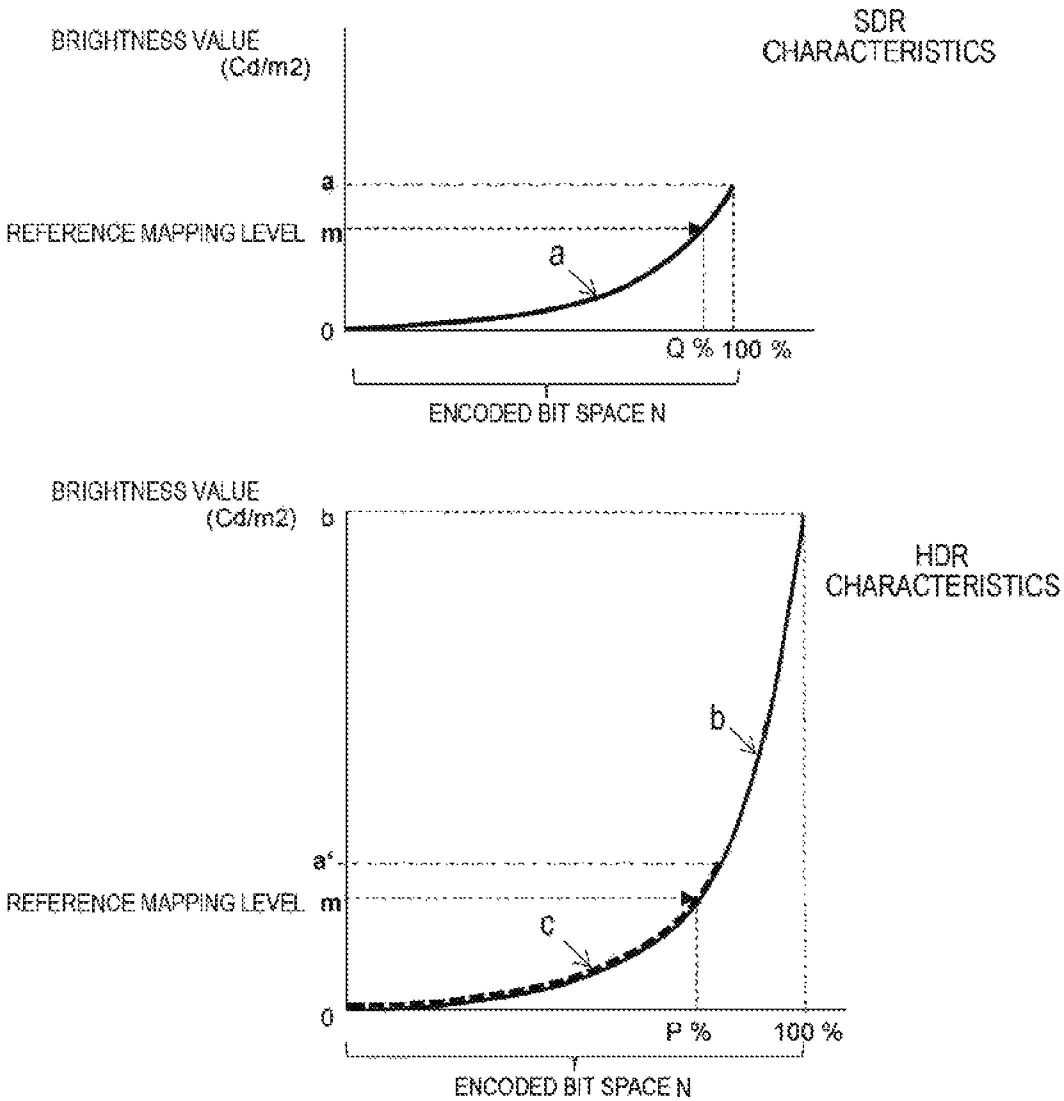
FIG. 6 is a graph for describing brightness level from SDR into HDR.

FIG. 6 illustrates a state in such brightness level conversion. In FIG. 6, a solid line a indicates an SDR conversion curve. A solid line b indicates an HDR conversion curve. A dashed c indicates an SDR data range mapped to the HDR conversion curve.

In this case, an SDR subtitle graphics data brightness value "m" is taken as a reference mapping value coincident with an HDR video data brightness value "m." When an encoded code value indicating the SDR subtitle graphics data brightness value "m" is Q % and an encoded code value indicating the HDR video data brightness value "m" is P %, the SDR subtitle graphics data is converted such that a digital code indicating Q % is coincident with a digital code indicating P %.

With this configuration, [0 . . . a] of the SDR subtitle graphics data is the range of [0 . . . a'] of the HDR video data. This prevents extremely-high subtitle brightness, for example. Note that in the figure, the same encoded bit space N is applied to both of SDR and HDR. Moreover, $0<P\leq 100$ and $0<Q\leq 100$ are satisfied.

The subtitle graphics data whose brightness level has been converted by the fourth conversion function 304 as described above is converted conformable to the color gamut of the superimposition target video data by the fifth conversion function 305. For example, a subtitle graphics data color gamut, of BT.709 is converted conformable to a superimposition target video data color gamut of BT.2020.

By the sixth conversion function 306, the subtitle graphics data subjected to color gamut conversion is photoelectrically converted by application of the HDR photoelectric conversion characteristics. This results in the subtitle graphics data exhibiting the same HDR photoelectric conversion characteristics as those of the superimposition target video data. This subtitle graphics data is converted from the RGB2 domain into YCbCr by the seventh conversion function 307, and the resultant graphics data is taken as the output graphics data.

In the case (4), all of the first conversion function 301 to the seventh conversion function 307 are necessary as in the above-described case (3). In this case, the bitmap data is converted into the subtitle graphics data, by the first conversion function 301. The resultant subtitle graphics data is converted from the YCbCr domain into the RGB1 domain by the second conversion function 302.

The subtitle graphics data converted into the RGB1 domain is photoelectrically converted by application of the HDR photoelectric conversion characteristics, and is brought into the brightness linear space by the third conversion function 303. The brightness level of the subtitle graphics data in the brightness linear space is converted by the fourth conversion function 304. In this case, conversion is performed such that a predetermined HDR brightness level reaches a reference SDR mapping level.

Figures 7, 8:
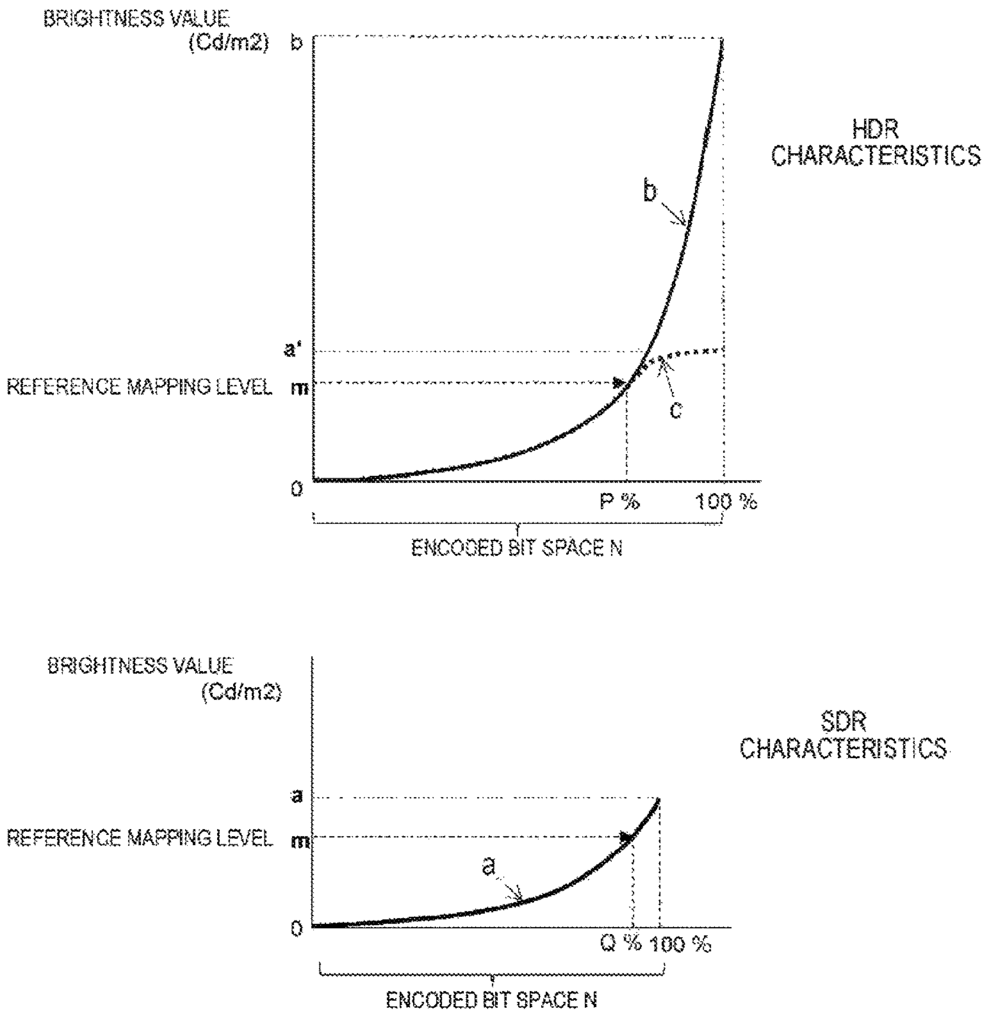
FIG. 7 is a graph for describing brightness level from HDR into SDR.
FIG. 8 is a table for describing the bitmap conversion table information in the case of not including the video information in the CLUT transfer loop.

FIG. 7 illustrates a state in such brightness level conversion. In FIG. 7, a solid line a indicates an SDR conversion curve. A solid line b indicates an HDR conversion curve. A dashed line c indicates is conversion curve for the purpose of mapping the HDR conversion curve to SDR.

In this case, an HDR subtitle graphics data brightness value "m" is taken as a reference mapping value coincident with an SDR video data brightness value "m". When an encoded code vale indicating the HDR subtitle graphics data brightness vale "m" is P % and an encoded code value indicating the SDR video data brightness value "m" is Q %, the HDR subtitle graphics data is converted according to the conversion curve with tone-map characteristics as indicated by the dashed line c such that a digital code indicating P % is coincident with a digital code indicating Q %.

With this configuration, [0 . . . b] of the HDR subtitle graphics data becomes [0 . . . a'], and falls within the range of [0 . . . a] of the SDR video data without clipping. Note that in the figure, the same encoded bit space N is applied to both of SDR and HDR. Moreover, $0<P\leq 100$ and $0<Q\leq 100$ are satisfied.

The subtitle graphics data whose brightness level has been converted by the fourth conversion function 304 as described above is converted conformable to the color gamut of the superimposition target video data by the fifth conversion function 305. For example, a subtitle graphics data color gamut or BT.2020 is converted conformable to a superimposition target video data color gamut of BT.709.

By the sixth conversion function 306, the subtitle graphics data subjected to color gamut conversion is photoelectrically converted by application of the SDR photoelectric conversion characteristics. This results in the subtitle graphics data exhibiting the same SDR photoelectric conversion characteristics as those of the superimposition target video data. This subtitle graphics data is converted from the RGB2 domain into the YCrCb by the seventh conversion function 307, and the resultant graphics data is taken as the output graphics data.

In the case (5), only the first conversion function 301 is necessary. In this case, the bitmap data is converted into the subtitle graphics data by the first conversion function 301, and the resultant graphics data is directly taken as the output graphics data. In this case, any of the subtitle graphics data before conversion into the bitmap data and the superimposition target video data is HDR and has the same color gamut, and therefore, the second conversion function 302 to the seventh conversion function 307 are bypassed.

Note that the illustrated example shows a case where the same HDR characteristics are applied to the subtitle graphics data before conversion into the bitmap data and the superimposition target video data. In the case of different HDR characteristics between both types of data, brightness level conversion is also necessary as in the cases (3), (4). The case of the different HDR characteristics between both types of data is, for example, a case where the HDR characteristics of the subtitle graphics data are PQ and the HDR characteristics of the video data are HLG, or the like.

Next, (B) the case of not including the video information in the CLUT transfer loop will be described. The conversion unit 103 outputs the bitmap conversion table information used for each of cases (1) to (3) of FIG. 3, for example. The case (1) is a case where the subtitle graphics data after conversion from the bitmap data upon displaying of the subtitles is SDR and the color gamut is narrow (e.g., BT.709).

The case (2) is a case where the subtitle graphics data after conversion from the bitmap data upon displaying of the subtitles is SDR and the color gamut is wide (e.g., BT.2020). The case (3) is a case where the subtitle graphics data after conversion from the bitmap data upon displaying of the subtitles is HDR.

Referring back to FIG. 2, the subtitle encoder 104 is configured to convert the bitmap data and display control information output from the conversion unit 103 into various segments, thereby generating a subtitle stream SS including a PES packet configured such that these segments are arranged on a payload. Various segments include not only typically-known segments such as DDS, PCS, RCS, CDS, ODS, and EDS, but also the newly-defined rendering guide segment (RGS: rendering_guide_segment). Note that although will be described later, the definition of the CDS is extended in the present technology.

The CLUT definition segment (CDS: CLUT_definition_segment) contains the information regarding the predetermined number of bitmap conversion tables output from the conversion unit 103. Moreover, the rendering guide segment contains the characteristic information, which corresponds to each of the predetermined number of bitmap conversion tables, regarding the subtitle graphics data before conversion into the bitmap data and the superimposition target video data ((A) the case of including the video information in the CLUT transfer loop) or only the characteristic information regarding the subtitle graphics data after conversion from the bitmap data ((B) the base of not including the video information in the CLUT transfer loop).

In the present technology, the CLUT definition segment forms the first segment, and the rendering guide segment forms the second segment. The same identification information "CLUT_id" is added to the bitmap conversion table contained in the CLUT definition segment and the characteristic information contained in the rendering guide segment corresponding to this bitmap conversion table, and in this manner, the bitmap conversion table and the characteristic information are associated with each other.

FIGS. 9 and 10 illustrate a structure example (Syntax) of the CLUT definition segment (CDS), and FIG. 11 illustrates the contents (Semantics) of main information in this structure example. An 8-bit field of "CLUT_id" indicates the identification information (ID) regarding the individual CLUTs (bitmap conversion tables). A newly-defined 2-bit field of "output_range_type" indicates the bit depth of each element of Y, Cr, Cb, and T as the output graphics data. "0" indicates that the bit depth of each element of Y, Cr, Cb, and T satisfies 6:4:4:2. Moreover, "1" indicates that the bit depth of each element if Y, Cr, Cb, and T satisfies 8:8:8:8. "2" indicates that the bit depth of each element of Y, Cr, Cb, and T satisfies 10:10:10:10. "3" indicates that the bit depth of each element of Y, Ce, Cb, and T satisfies 12:12:12:12. Note that the bit depths of "2" and "3" are not present for a typical CLUT, and are for preparation according to a superimposed video bit depth.

FIGS. 12 and 13 illustrate structure examples (Syntax) of the rendering guide segment (RGS), and FIG. 14 illustrates the contents (Semantics) of main information in these structure examples. In this example, FIG. 12 illustrates the structure example of the rendering guide segment in (A) the case of including the video information in the CLUT transfer loop, and FIG. 13 illustrates the structure example of the rendering guide segment in (B) the case of not including the video information in the CLUT transfer loop.

The structure example of the rendering guide segment (RGS) illustrated in FIG. 12 will be described. An 8-bit field of "number_of_rendering_option_sets" indicates the number of pieces of CLUT (bitmap conversion table) information. Moreover, each of fields of "CLUT_id," "subtitle_color_gamut_information," "subtitle_dynamic_range_information," "video_color_gamut_information," and "video_dynamic_range_information," is repeated by the CLUT information number. Note that in the case of transferring the multiple CLUTs, multiple CDSs as container segments for these CLUTs are inserted into the subtitle stream (a subtitle encoded stream).

The 8-bit field of "CLUT_id" indicates the identification information (ID) regarding the individual CLUTs (bitmap conversion tables). The 8-bit field of "subtitle_color_gamut_information" indicates the color gamut of the subtitle graphics data before conversion into the bitmap data i.e., in the produced state, and the meaning of the value is similar to that of "color_primaries" of an HEVC standard. The 8-bit field of "subtitle_dynamic_range_information" indicates the type of dynamic range of the subtitle graphics data before conversion into the bitmap data, i.e., in the produced state, and the meaning of the value is similar to that of "transfer_characteristics" of the HEVC standard.

The 8-bit field of "video_color_gamut_information" indicates the color gamut of the superimposition target video data, and the meaning of the value is similar to that of "color_primaries" of the HEVC standard. The 8-bit field of "video_dynamic_range_information" indicates the type of dynamic range of the superimposition target video data, and the meaning of the value is similar to that of "transfer_characteristics" of the HEVC standard.

Next, the structure example of the rendering guide segment (RGS) illustrated in FIG. 13 will be described. An 8-bit field of "number_of_rendering_option_sets" indicates the number of pieces of CLUT (bitmap conversion table) information. Moreover, each of fields of "CLUT_id," "subtitle_color_gamut_information," and "subtitle_dynamic_range_information" is repeated by the CLUT information number. Note that in the case of transferring the multiple CLUTs, the multiple CDSs as container segments for these CLUTs are inserted into the subtitle stream (the subtitle encoded stream).

The 8-bit field of "CLUT_is" indicates the identification information (ID) regarding the individual CLUTs (bitmap conversion tables). The 8-bit field of "subtitle_color_gamut_information" indicates the color gamut of the subtitle graphics data after conversion from the bitmap data, and the meaning of the value is similar to that of "color_primaries"

of the HEVC standard. The 8-bit field of "subtitle_dynamic_range_information" indicates the type of dynamic range of the subtitle graphics data after conversion from the bitmap data, and the meaning of the value is similar to that of "transfer_characteristics" of the HEVC standard.

FIG. 15 illustrates a variation of the bitmap conversion table in (A) the case of including the video information in the CLUT transfer loop. The illustrated example shows that the bitmap conversion table (CLUT) with "CLUT_id" of "1" is applied to a case where ("subtitle_dynamic_range_information," "subtitle_color_gamut_information," "video_dynamic_range_information," and "video_color_gamut_information") are each (SDR, BT.709, SDR, BT.709).

Moreover, the illustrated example shows that the bitmap conversion table (CLUT) with "CLUT_id" of "2" is applied to a case where ("subtitle_dynamic_range_information," "subtitle_color_gamut_information," "video_dynamic_range_range_information," "video_color_gamut_information") are each (SDR, BT.709, SDR, BT.2020). Further, the illustrated example shows that the bitmap conversion table (CLUT) with "CLUT_id" of "3" is applied to a case where ("subtitle_dynamic_range_information," "subtitle_color_gamut_information," "video_dynamic_range_information," and "video_color_gamut_information") are each (SDR, BT.709, HDR, BT.2020).

In addition, the illustrated example shows that the bitmap conversion table (CLUT) with "CLUT_id" of "4" is applied to a case where ("subtitle_dynamic_range_information," "subtitle_color_gamut_information," "video_dynamic_range_information," and "video_color_gamut_information") are each (HDR, BT.2020, SDR, BT.2020). Moreover, the illustrated example shows that the bitmap conversion table (CLUT) with "CLUT_id" of "5" is applied to a case where ("subtitle_dynamic_range_information," "subtitle_color_gamut_information," "video_dynamic_range_information," and "video_color_gamut_information") are each (HDR, BT.2020, HDR, BT.2020).

FIG. 16 illustrates a variation of the bitmap conversion table in (B) the case of not including the video information in the CLUT transfer loop. The illustrated example shows that the bitmap conversion table (CLUT) with "CLUT_id" of "1" is applied to a case where ("subtitle_dynamic_range_information" and "subtitle_color_gamut_information" are each (SDR, BT.709).

Moreover, the illustrated example shows that the bitmap conversion table (CLUT) with "CLUT_id" of "2" is applied to a case where ("subtitle_dynamic_range_information" and "subtitle_color_gamut_information" are each (SDR, BT.2020). Further, the illustrated example shows that the bitmap conversion table (CLUT) with "CLUT_id" of "3" is applied to a case where ("subtitle_dynamic_range_information" and "subtitle_color_gamut_information" are each (HDR, BT.2020).

Referring back to FIG. 2, the system encoder 105 generates the transport stream TS containing the video stream VS generated by the video encoder 102 and the subtitle stream SS generated by the subtitle encoder 104. The transmission unit 106 transmits the transport stream TS to the receiving device 200 with the transport stream TS being on the broadcasting wave or the net package.

"Configuration Example of Transport Stream TS"

Figure 17:
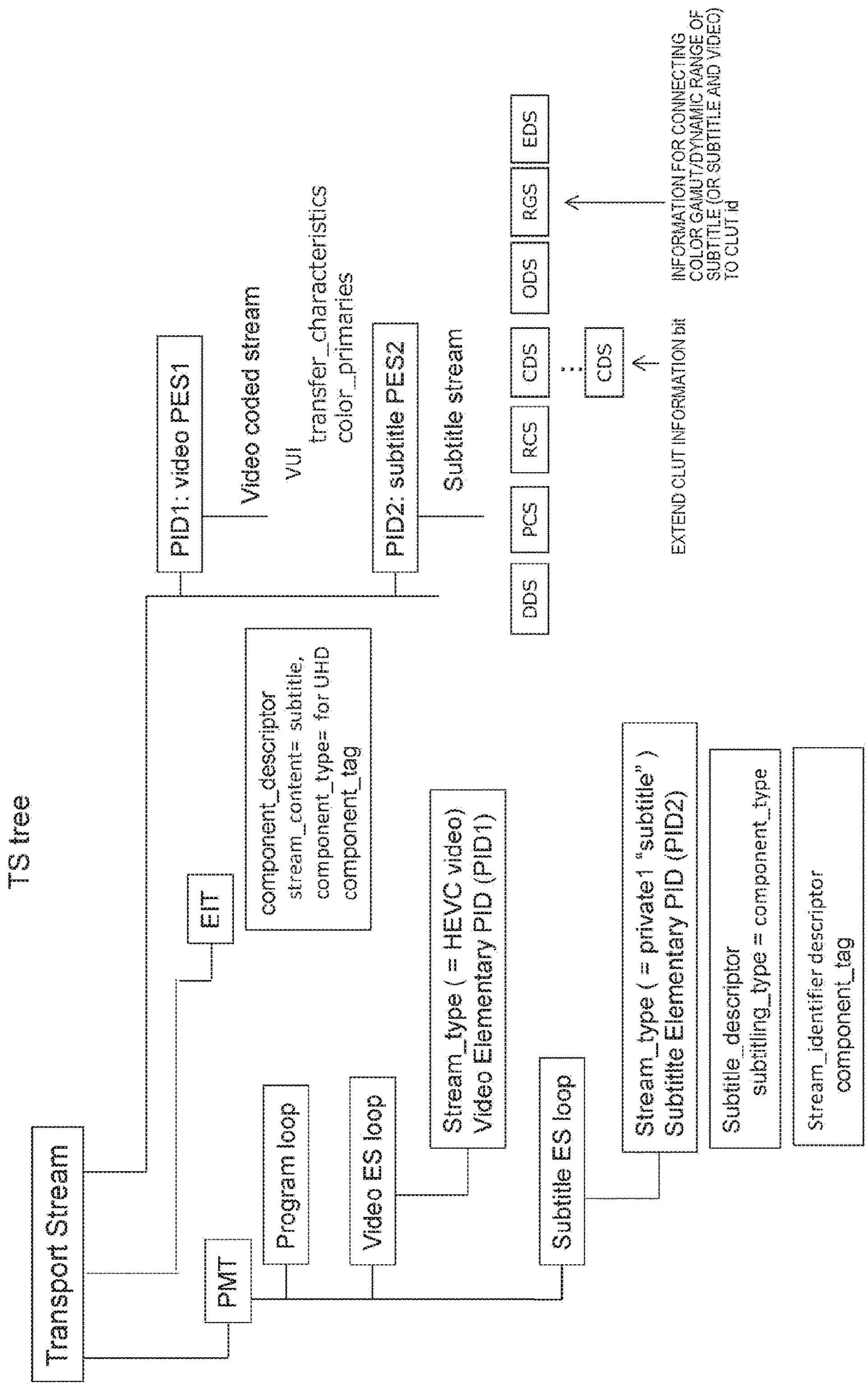
FIG. 17 is a diagram of a configuration example of a transport stream.

FIG. 17 illustrates a configuration example of the transport stream TS. In this configuration example, "Video PES1" as the PES packet of the video stream identified by PID1 is present. Moreover, in this configuration example, "Subtitle PES2" as the PES packet of the subtitle stream identified by PID2 is present.

The PES packet includes a PES header and a PES payload. In the PES packet of the video stream, the video encoded stream is inserted into the PES payload. Color gamut identification information (color_primaries) and dynamic range information (transfer_characteristics) of the transferred video data are inserted into the VUI region of the SPS NAL unit of the access unit. Moreover, not only the typically-known segments such as DDS, PCS, RCS, CDS, ODS, and EDS but also the above-described newly-defined rendering guide segment (RGS) are inserted into the PES packet of the subtitle stream.

Further, the transport stream TS contains a program map table (PMT) as program specific information (PSI). The PSI is information indicating a program to which each elementary stream contained in the transport steam belongs. In the PMT, a program loop describing information relating to an entire program is present.

In addition, in the PMT, an elementary stream loop with information relating to each elementary stream is present. In this configuration example, a video elementary stream loop (video ES loop) corresponding to the video stream and a subtitle elementary stream loop (Subtitle ES loop) corresponding to the subtitle stream are present. In the video elementary stream loop (video ES loop), information such as a stream type and a packed identifier (PID) is arranged corresponding to the video stream, and a descriptor describing such information relating to the video stream is also arranged. The value of "Stream_type" of this video stream is, for example, set to a value indicating a HEVC video stream, and PID information indicates PID1 provided to the PES packet "video PES1" of the video stream.

In the subtitle elementary stream loop (Subtitle ES loop), information such as a stream type and a packet identifier (PID) is arranged corresponding to the subtitle stream, and a descriptor describing such information relating to the subtitle stream is also arranged. The value of "Stream_type" of this subtitle stream is, for example, set to a value indicating a private stream, and PID information indicates PID2 provided to the PES packet "Subtitle PES2" of the subtitle stream.

A component descriptor (component_descriptor) is present under EIT. Of this component descriptor, "Stream_content" indicates that a target is the subtitle (subtitle), and a "component_type" indicates that the EIT is directed to UHD. Meanwhile, in the subtitle elementary stream loop (Subtitle ES loop) under the PMT, a subtitle descriptor (Subtitle_descriptor) and a stream identifier descriptor (Stream_identifier_descriptor) are present. "Subtitling_type" of the subtitle descriptor is set as in "component_type" of the component descriptor, and indicates that the PMT is directed to the UHD. Moreover, it is configured such that connection to the component descriptor is made by "component_tag" of the stream identifier descriptor.

Operation of the transmission device 100 illustrated in FIG. 2 will be briefly described. The video data is supplied to the video encoder 102. This video data to SDR or HDR data with SDR or HDR photoelectric conversion characteristics.

In the video encoder 102, encoding such as MPEG4-AVC or HEVC is performed for the video data, for example, and the video stream (the PES stream) VS containing the encoded video data is generated. At this point, the meta information such as the information (transfer_function) indicating photoelectric conversion characteristics corresponding to the photoelectric conversion characteristics of the video data and the information (color_primaries) indicating the color gamut of the video data are inserted into the VUI region of the SPS NAL unit of the access unit (AU).

Meanwhile, the subtitle graphics data is supplied to the conversion unit 103. This subtitle graphics data is SDR or HDR data with SDR or HDR photoelectric conversion characteristics. In the conversion unit 103, the subtitle graphics data is converted into the bitmap data. The information regarding one or more bitmap conversion tables assumed as being necessary on the receiving side is, together with the bitmap data, output from the conversion unit 103.

The bitmap conversion table described herein is the bitmap conversion table containing the color gamut and/or brightness conversion information. That is, this bitmap conversion table is not for merely converting the bitmap data into the subtitle graphics data, but for also converting the color gamut or the brightness such that such color gamut or brightness is conformable to that of the super imposition target video data as video data targeted for superimposition.

Two types of cases including (A) the case of including the video information in the CLUT transfer loop and (B) the case of not including the video information in the CLUT transfer loop are conceivable for the bitmap conversion unit 103, and the bitmap conversion table information in any case is applied.

The bitmap data and the bitmap conversion table information output from the conversion unit 103 are supplied to the subtitle encoder 104. In the subtitle encoder 104, the bitmap data and the display control information are converted into various segments, and the subtitle stream SS including the PES packet configuration such that these segments are arranged in the payload is generated.

Various segments include not only the typically-known segments such as DDS, PCS, RCS, CDS, ODS, and EDS, but also the newly-defined rendering guide segment. The CLUT definition segment (CDS) contains the information regarding the predetermined number of bitmap conversion tables output from the conversion unit 103 (see FIGS. 9 and 10).

Moreover, the rendering guide segment contains the characteristic information, corresponding to each of the predetermined number of bitmap conversion tables, regarding the subtitle graphics data before conversion into the bitmap data and the superimposition target video data ((A) the case of including the video information in the CLUT transfer loop) or only the characteristic information regarding the subtitle graphics data after conversion from the bitmap data ((B) the case of not including the video information in the CLUT transfer loop) (see FIGS. 12 and 13).

The video system VS generated by the video encoder 102 is supplied to the system encoder 105. The subtitle stream SS generated by the subtitle encoder 104 is supplied to the system encoder 105. In the system encoder 105, the transport stream TS containing the video stream VS and the subtitle stream SS is generated. The transport stream TS is transmitted to the receiving device 200 by the transmission unit 106 with the transport stream TS being on the broadcast wave or the net packet.

"Configuration Example of Receiving Data"

Figure 18:
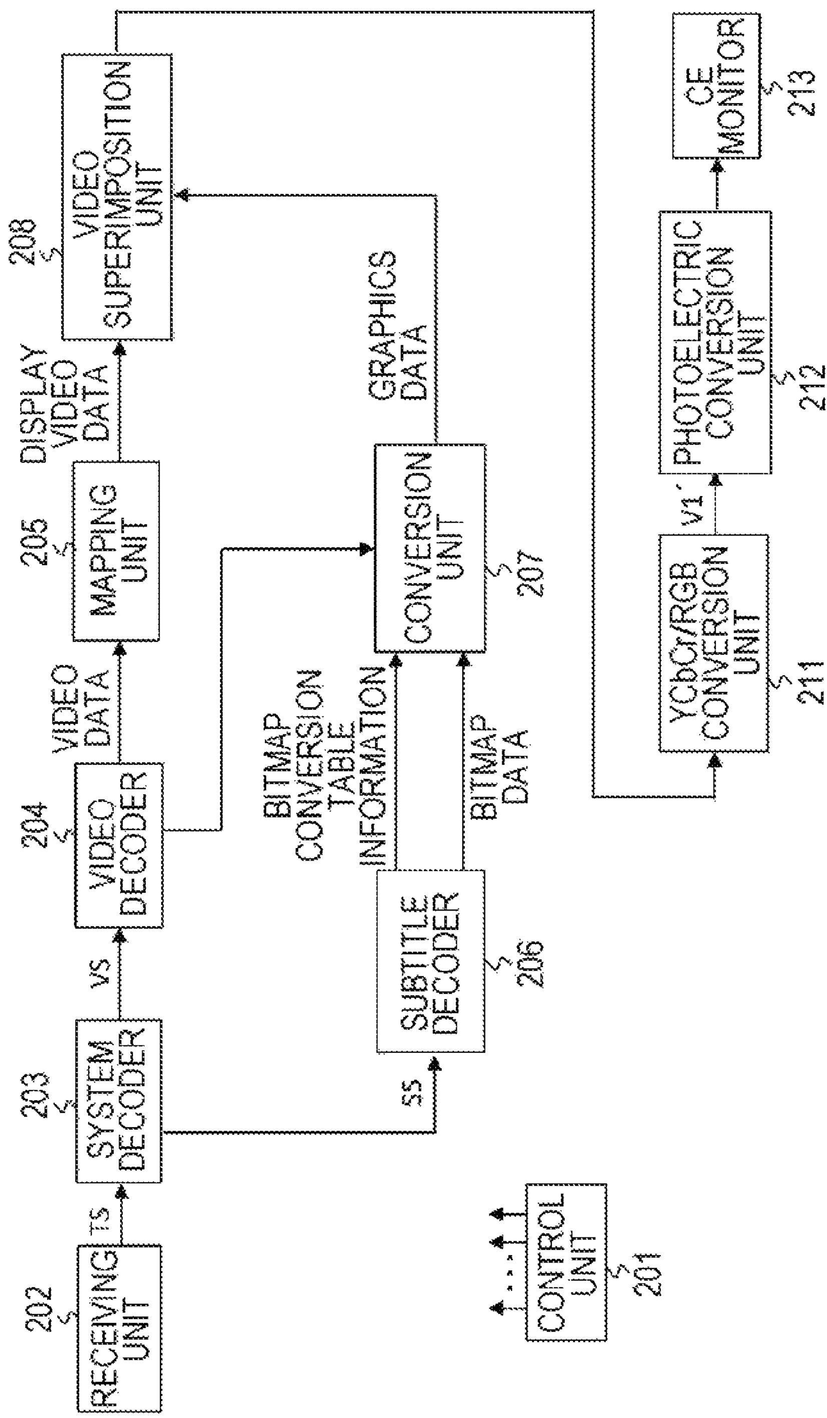
FIG. 18 is a block diagram of a configuration example of a receiving device.

FIG. 18 illustrates a configuration example of the receiving device 200. The receiving device 200 has a control unit 201, a receiving unit 202, a system decoder 203, a video decoder 204, a mapping unit 205, a subtitle decoder 206, a conversion unit 207, and a video superimposition unit 208. Moreover, the receiving device 200 has a YCbCr/RGB conversion unit 211, a photoelectric conversion unit 212, and a CE monitor 213.

The control unit 201 includes a central processing unit (CPU), and is configured to control operation of each unit of the receiving device 200 on the basis of a control program. The receiving unit 202 is configured to receive the transport stream TS transmitted from the transmission device 100 with the transport stream TS being on the broadcast wave or the net packet. The system decoder 203 is configured to extract the video stream VS and the subtitle stream SS from the transport stream TS.

The video decoder 204 is configured to decode the video stream VS extracted by the system decoder 203, thereby obtaining the video data. Moreover, the video decoder 204 is configured to extract a parameter set or a SEI message inserted into each access unit forming the video stream VS, thereby transmitting the parameter set or the SEI message to the control unit 201. The mapping unit 205 is configured to perform, if needed, the color gamut or dynamic range conversion processing for the video data obtained by the video decoder 204, thereby obtaining the display video data so that the display video data can be displayed on the CE monitor 213.

The subtitle decoder 206 is configured to decode the subtitle stream SS extracted by the system decoder 203, thereby obtaining the bitmap data and the information regarding the predetermined number of bitmap conversion tables, i.e., one or more bitmap conversion tables. At this point, the information regarding the predetermined number of bitmap conversion tables is obtained from the above-described CLUT definition segment (see FIGS. 9 and 10).

Moreover, at this point, the characteristic information corresponding to each of the predetermined number of bitmap conversion tables is extracted from the above-described rendering guide segment (see FIGS. 12 and 13), and then, is transmitted to the control unit 201. In this case, in (A) the case of including the video information in the CLUT transfer loop, the characteristic information regarding the subtitle graphics data before conversion into the bitmap data and the superimposition target video data is extracted. On the other hand, in (B) the case of not including the video information in the CLUT transfer loop, only the characteristic information regarding the subtitle graphics data after conversion from the bitmap data is extracted.

The conversion unit 207 is configured to use, under the control of line control unit 201, the conformable bitmap conversion table of the predetermined number of bitmap conversion tables, thereby converting the bitmap data into the subtitle graphics data. In this case, the control unit 201 selects the bitmap conversion table, which should be used, on the basis of the characteristic information extracted from the rendering guide segment and corresponding to each of the predetermined number of bitmap conversion tables as described above.

In (A) the case of including the video information in the CLUT transfer loop, the control unit 201 described herein selects such a bitmap conversion table that the dynamic range/color gamut indicated by "subtitle_dynamic_range_information" and "subtitle_color_gamut_information" are coincident with the dynamic range/color gamut of the subtitle graphics data before conversion into the bitmap data and that the dynamic range/color gamut indicated by "video_dynamic_range_information" and "video_color_gamut_information" are coincident with the dynamic range/color gamut of the display video data (the superimposition target video data).

Figure 19:
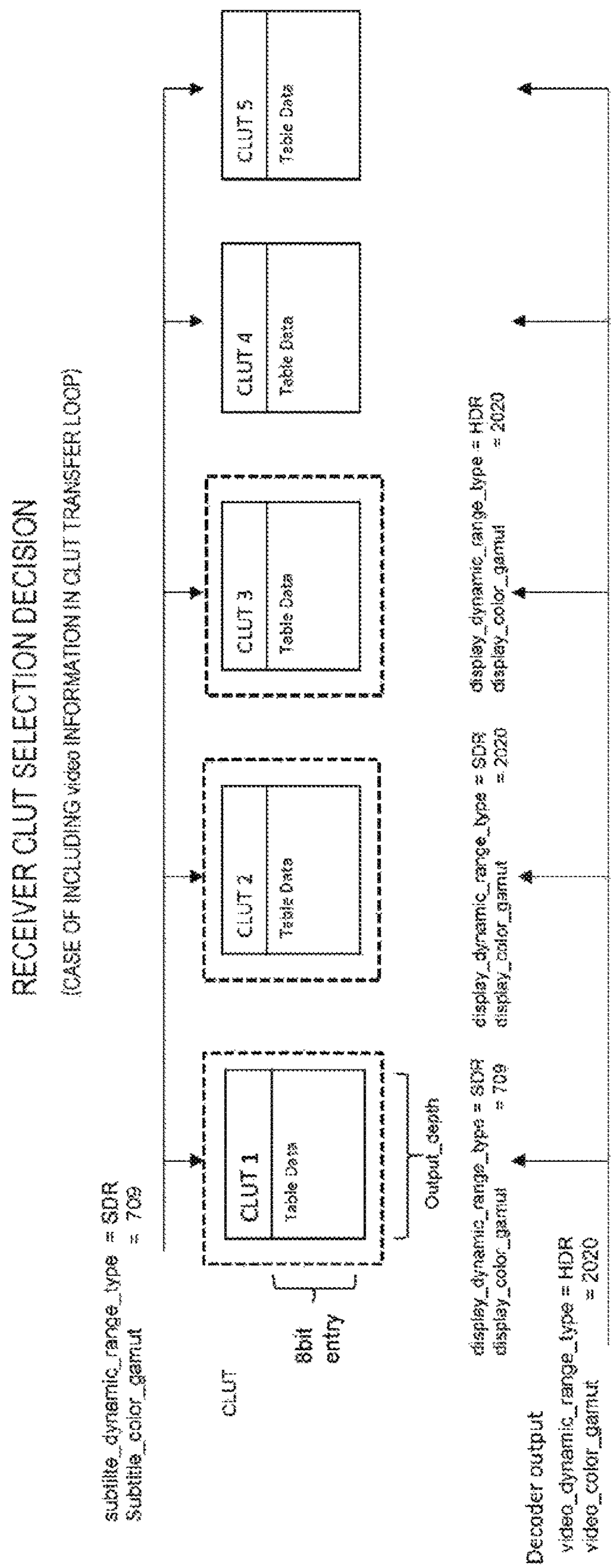
FIG. 19 is diagram of a selection example of the bitmap conversion table in the case of including the video information in the CLUT transfer loop.

FIG. 19 illustrates a selection example of the bitmap conversion table in this case. Note that it is assumed that CLUT1 to CLUT 5 are the bitmap conversion tables identified by "CLUT_id" of "1" to "5" in FIG. 15, respectively. Note that in a case where the subtitle graphics date is SDR/709, only the CLUT 1 to the CLUT 3 of the CLUT 1 to the CLUT 5 are transmitted.

Figure 21:
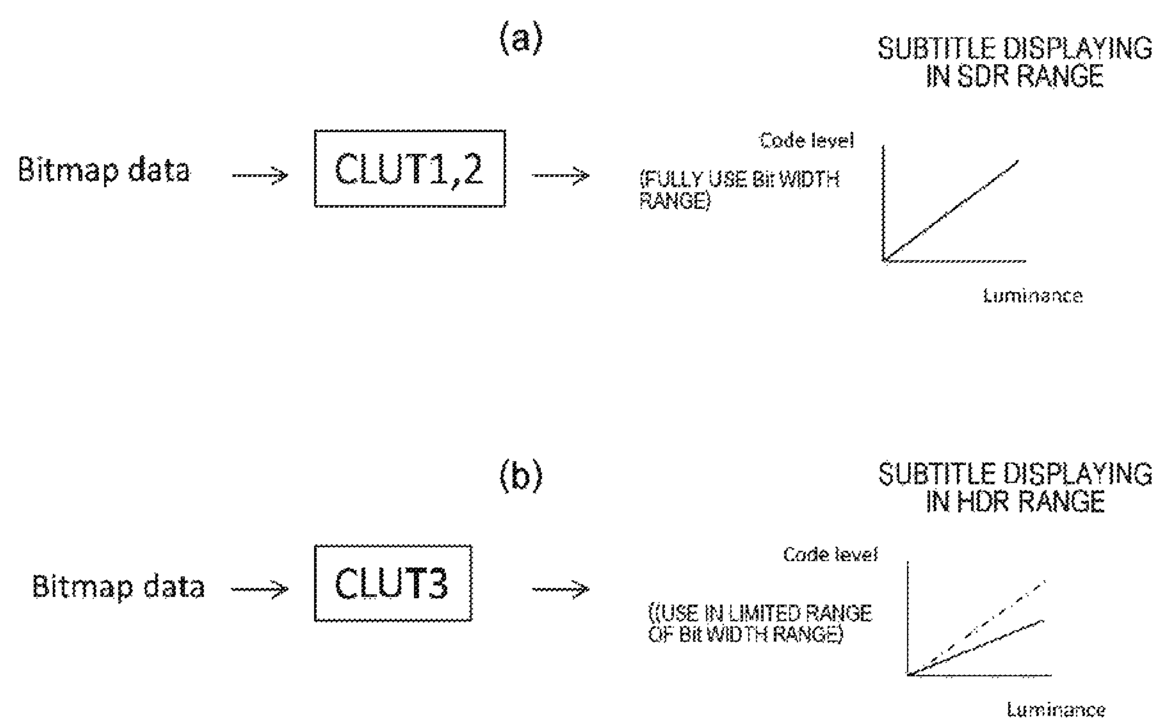
FIG. 21 is a graph for describing a bit width use range in the case of performing subtitle displaying in an SDR range and the case of performing subtitle displaying in an HDR range.

For example, in a case where the subtitle graphics data is SDR/709 and the video data output from the video decoder 204 is HDR/2020 and a case where the superimposition target video data output from the mapping unit 205 is HDR/2020 (a display (the CE monitor 213) is compatible with HDR/2020), the CLUT3 is selected. In this case, the subtitle graphics data output from the conversion unit 207 is, as illustrated in FIG. 21 (*b*), for subtitle displaying in an HDR range, and is used in a limited range with respect to an entire bit width range.

Moreover, in a case where the subtitle graphics data is SDR/709 and the video data output from the video decoder 204 is HDR/2020 and a case where the superimposition target video data output from the mapping unit 205 is SDR/2020 (the display (the CE monitor 213) is compatible with SDR/2020), the CLUT2 is selected, for example. In this case, the subtitle graphics data output from the conversion unit 207 is, as illustrated in FIG. 21 (*a*), for subtitle displaying in an SDR range, and is fully used in the entire bit width range.

Further, in a case where the subtitle graphics data is SDR/709 and the video data output from the video decoder 204 is HDR/2020 and a case where the superimposition target video data output from the mapping unit 205 is SDR/709 (the display (the CE monitor 213) is compatible with SDR/709), the CLUT1 is selected, for example. In this case, the subtitle graphics data output from the conversion unit 207 is, as illustrated in FIG. 21(*a*), for subtitle displaying in the SDR range, and is fully used in the entire bit width range.

On the other hand, in (B) the case of not including the video information in the CLUT transfer loop, the control unit 201 selects such a bitmap conversion table that the dynamic range/color gamut indicated by "subtitle_dynamic_range_information" and "subtitle_color_gamut_information" are coincident with the dynamic range/color gamut of the display video data (the superimposition target video data).

Figure 20:
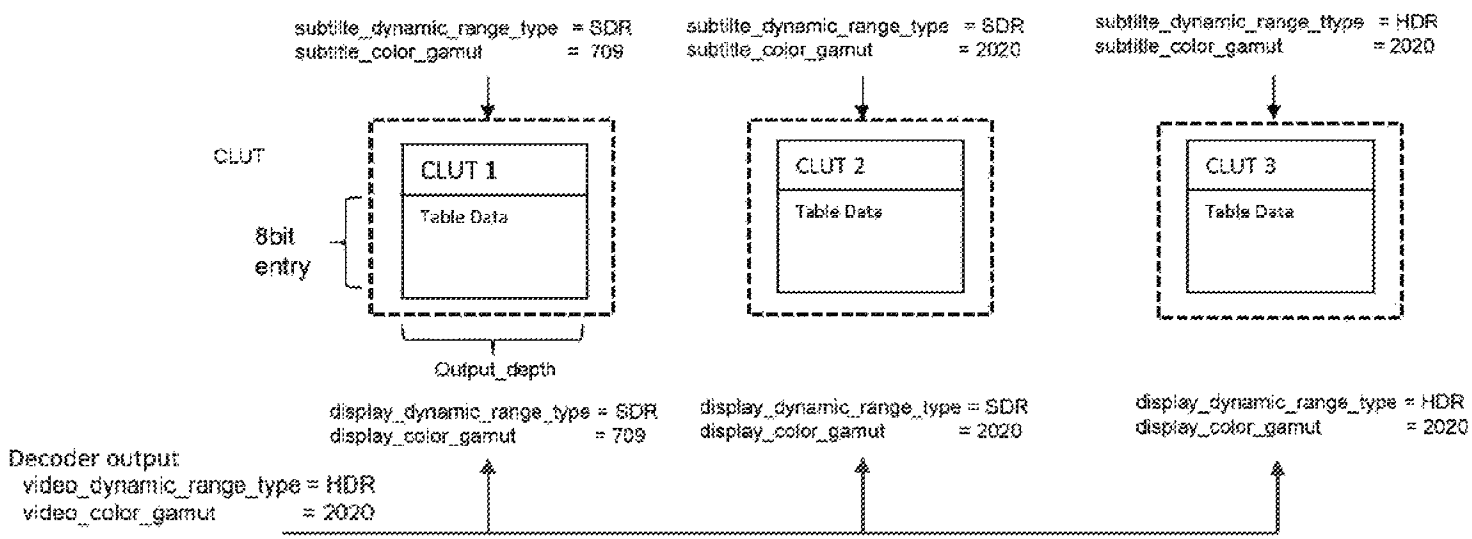
FIG. 20 is a diagram of a selection example of the bitmap conversion table in the case of not including the video information in the CLUT transfer loop.

FIG. 20 illustrates a selection example of the bitmap conversion table in this case. Note that CLUT1 to CLUT3 are the bitmap conversion tables identified by "CLUT_id" of "1" to "3" in FIG. 16, respectively.

For example, in a case where the video data output from the video decoder 204 is HDR/2020 and a case where the superimposition target video data output from the mapping unit 205 is HDR/2020 (the display (the CE monitor 213) is compatible with HDR/2020), the CLUT 3 is selected. In this case, the subtitle graphics data output from the conversion unit 207 is, as illustrated in FIG. 21(*b*), for subtitle displaying in the HDR range, and the bitmap data is converted into the limited range with respect to the entire bit width range of the CLUT output.

Moreover, in a case where the video data output from the video decoder 204 is HDR/2020 and a case where the superimposition target video data output from the mapping unit 205 if SDR/2020 (the display (the CE monitor 213) is compatible with SDR/2020), the CLUT 2 is selected, for example. In this case, the subtitle graphics data output from the conversion unit 207 is, as illustrated in FIG. 21(*a*), for subtitle displaying in the SDR range, and the bitmap data is converted in the entire bit width range of the CLUT output.

Further, in a case where the video data output from the video decoder 204 is HDR/2020 and a case where the superimposition target video data output from the mapping unit 205 is SDR/709 (the display (the CE monitor 213) is compatible with SDR/709), the CLUT 1 is selected, for example. In this case, the subtitle graphics data output from the conversion unit 207 is, as illustrated in FIG. 21(*a*), for subtitle displaying in the SDR range, and is converted in the entire bit width range of the CLUT output.

Referring back to FIG. 18, the video superimposition unit 208 superimposes the subtitle graphics data output from the conversion unit 207 on the display video data (the superimposition target video data) output from the mapping unit 205.

Figure 22:
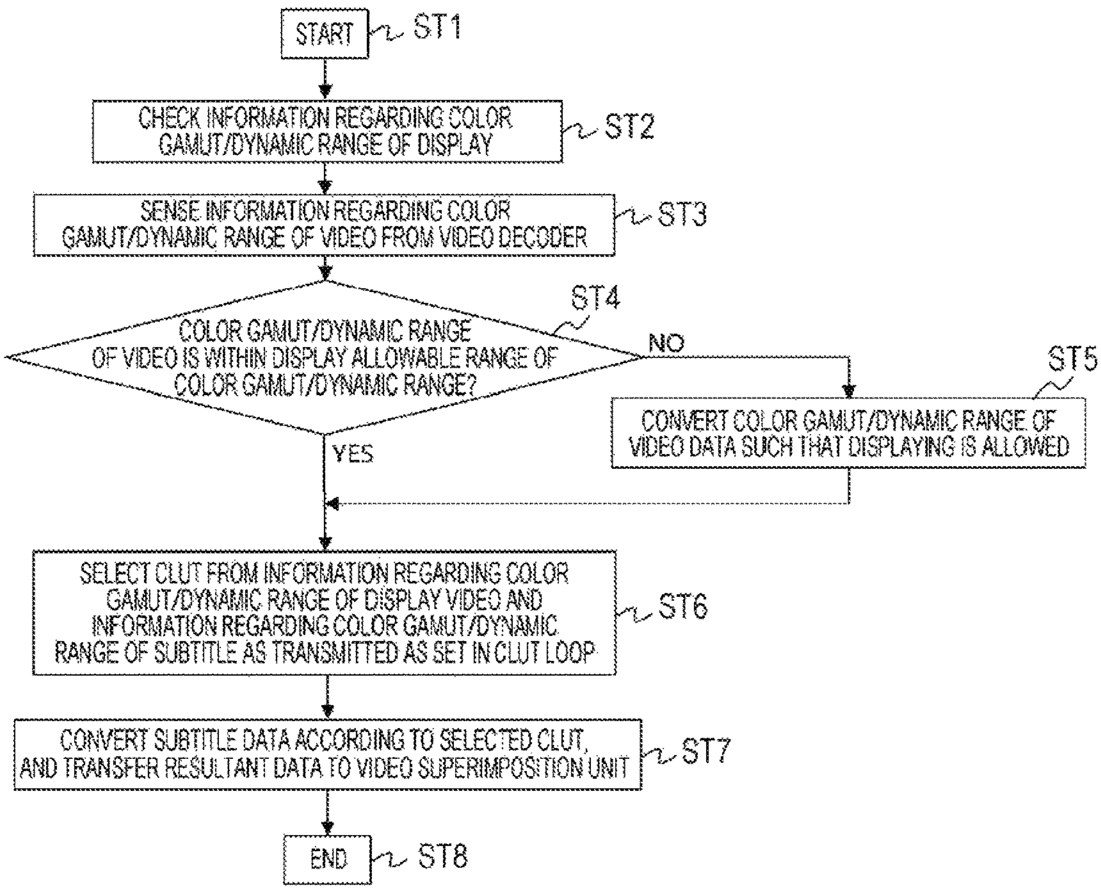
FIG. 22 is a flowchart of an example of a processing flow in the case of including the video information in the CLUT transfer loop.

FIG. 22 illustrates an example of a processing flow of the mapping unit 205, the conversion unit 207, and the like under the control of the control unit 201 in (A) the case of including the video information in the CLUT transfer loop. At a step ST1, the processing begins. Next, at a step ST2, the information regarding the color gamut/dynamic range of the display (the CE monitor 213) is checked.

Next, at a step ST3, the information regarding the color gamut/dynamic range of the video from the video decoder 204 is sensed. Then, at a step ST4, if is determined whether or not the color gamut/dynamic range of the video is within the display allowable range of the color gamut/dynamic range.

When not within the range, the color gamut/dynamic range of the video data is, at a step ST2, converted in the mapping unit 205 such that displaying if allowed, and the resultant video data is taken as the display video data. Note that when within the range, the video data from the video decoder 204 is directly taken as the display video data without conversion of the color gamut/dynamic range of the video data in the mapping unit 205.

Next, at a step ST6, the CLUT is selected from the information regarding the color gamut/dynamic range of the display video and the information regarding the color gamut/dynamic range of the subtitle, there types of information being transferred as a set in the CLUT loop. Next, at a step ST7, the subtitle data is converted according to the selected CLUT, and then, is transferred to the video superimposition unit 208. Then, at a step ST8, the processing ends.

Figures 23, 24:
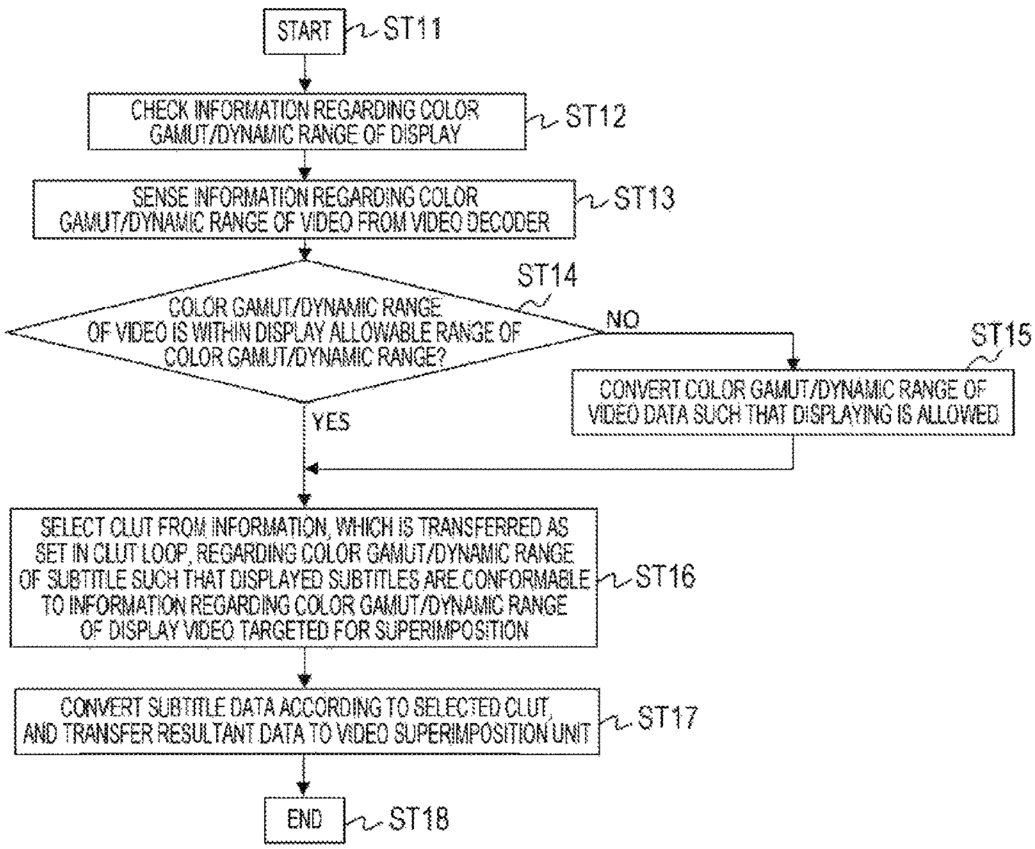
FIG. 23 is a flowchart of an example of a processing flow in the case of not including the video information in the CLUT transfer loop.
FIG. 24 is a table of a variation of the bitmap conversions table (CLUT) in subtitle transfer.

FIG. 23 illustrates an example of a processing flow of the mapping unit 205, the conversion unit 207, and the like under the control of the control unit 201 in (B) the case of not including the video information in the CLUT transfer loop. At a step ST11, the processing begins. Next, at a step ST12, the information regarding the color gamut/dynamic range of the display (the CB monitor 213) is checked.

Next, at a step ST13, the information regarding the color gamut/dynamic range of the video from the video decoder 204 is sensed. Then, at a step ST14, it is determined whether or not the color gamut/dynamic range of the video is within the display allowable range of the color gamut/dynamic range.

When not within the range, the color gamut/dynamic range of the video data is, at a step ST15, converted in the mapping unit 205 such that the displaying is allowed, and the resultant video data is taken as the display video data. Note that when within the range, the video data from the video decoder 204 is directly taken as the display video without conversion of the color gamut/dynamic range of the video data in the mapping unit 205.

Next, at a step ST16, the CLUT is selected from the information, which is transferred as a set in the CLUT loop, regarding the color gamut/dynamic range of the subtitle such that the displayed subtitles are conformable to the color gamut/dynamic range of the display video targeted for superimposition. Next, at a step ST17, the subtitle data is converted according to the selected CLUT, and then, is transferred to the video superimposition unit 208. Then, at a step ST18, the processing ends.

Referring back to FIG. 18, the YCbCr/RGB conversion unit 211 is configured to convert video data V1', on which the subtitle graphics data is superimposed, from the YCbCr (brightness/color difference) domain into the FGB domain. In this case, the YCbCr/RGB conversion unit 211 performs conversion by means of a conversion equation corresponding to the color gamut on the basis of the color gamut identification information.

The photoelectric conversion unit 212 is configured to perform photoelectric conversion for the video data V1' converted into the RGB domain by application of the photoelectric conversion characteristics corresponding to the photoelectric conversion characteristics applied to the video data V1'. In this manner, the photoelectric conversion unit 212 obtains the display video data for displaying the image. The CE monitor 213 is configured to display the image on the basis of the display video data. The CE monitor 213 includes, for example, a liquid crystal display (LCD), an organic electroluminescence display (an organic EL display), and the like.

Operation of the receiving device 200 illustrated in FIG. 18 will be briefly described. The receiving unit 202 receives the transport stream TS transmitted from the transmission device 100 with the transport stream TS being on the broadcast wave or the net packet. The transport stream TS is supplied to the system decoder 203. In the system decoder 203, the video stream VS and the subtitle stream SS are extracted from the transport stream TS.

The video stream VS extracted by the system decoder 203 is supplied to the video decoder 204. In the video decoder 204, the video stream VS is decoded, and in this manner, the video data is obtained. The resultant video data is transmitted to the mapping unit 205. In the mapping unit 205, the color gamut or dynamic range conversion processing is, if needed, performed for the video data such that displaying on the CE monitor 213 is allowed, and in this manner, the display video data is obtained.

The subtitle stream SS extracted by the system decoder 203 is supplied to the subtitle decoder 206. In the subtitle decoder 206, the subtitle stream SS is decoded, and in this manner, the bitmap data and the information regarding the predetermined number of bitmap conversion tables, i.e., one or more bitmap conversion tables, are obtained. The information regarding the predetermined number of bitmap conversion tables is obtained from the CLUT definition segment (see FIGS. 9 and 10).

Moreover, at this point, the characteristic information corresponding to each of the predetermined number of bitmap conversion tables is extracted from the rendering guide segment (see FIGS. 12 and 13), and then, is transmitted to the control unit 201. In this case, in (A) the case of including the video information in the CLUT transfer loop, the characteristic information regarding the subtitle graphics data before conversion into the bitmap data and the superimposition target video data is extracted. On the other hand, in (B) the case of not including the video information in the CLUT transfer loop, only the characteristic information regarding the subtitle graphics data after conversion from the bitmap data is extracted.

The bitmap data and the information regarding the predetermined number of bitmap conversion tables as obtained by the subtitle decoder 206 are supplied to the conversion unit 107, in the conversion unit 207, the conformable bitmap conversion table of the predetermined number of bitmap conversion tables is, under the control of the control unit 201, used to convert the bitmap data into the subtitle graphics data. In this case, in the control unit 201, the bitmap conversion table which should be used is selected on the basis of the characteristic information extracted from the rendering guide segment and corresponding to each of the predetermined number of bitmap conversion tables.

The display video data (the superimposition target video data) obtained by the mapping unit 205 is supplied to the video super imposition unit 208. Moreover, the subtitle graphics data obtained by the conversion unit 207 is supplied to the video superimposition unit 208. In the video superimposition unit 208, the subtitle graphics data is superimposed on the display video data. In this case, the subtitle graphics data is mixed with the video data at a predetermined ratio. The mixing ratio described herein is according to a T-Value.

The display video data V1' which is obtained by the video superimposition unit 208 and on which the subtitle graphics data is superimposed is converted from YCbCr (brightness/color difference) domain into the RGB domain in the YCbCr/RGB conversion unit 211, and then, is supplied to the photoelectric conversion unit 212. In the photoelectric conversion unit 212, photoelectric conversion is performed for the video data V1' by application of the photoelectric conversion characteristics corresponding to the photoelectric conversion characteristics applied to the video data V1'. In this manner, the display video data for displaying the image is obtained. This display video data is supplied to the CE monitor 213. The image is displayed on the CE monitor 213 on the basis of the display video data.

As described above, in the transmission/receiving system 10 illustrated in FIG. 1, the CLUT definition segment contained in the subtitle stream transmitted from the transmission side to the receiving side has the bitmap conversion table containing the color gamut and/or brightness conversion information. Thus, on the receiving side, the bitmap data is merely converted into the subtitle graphics data by means of the of the bitmap conversion table so that the subtitle graphics data with the characteristics conformable to the characteristics of the display video data (the superimposition target video data) can be easily obtained. Thus, the processing load on the receiving side can be reduced.

Moreover, in the firstly-described transmission/receiving system 10, the subtitle stream transmitted from the transmission side to the receiving side further contains the second segment with the characteristic information corresponding to each of the predetermined number of bitmap conversion tables. On the receiving side, the bitmap conversion table which should be used can be easily and suitably selected from the predetermined number of bitmap conversion tables.

2. VARIATIONS

Note that in the above-described embodiment, the example where the multiple bitmap conversion tables (CLUTs) are transmitted from the transmission side to the receiving side has been described. However, in a case where the characteristics (the dynamic range, the color gamut) of the video on which the subtitle is superimposed can be uniquely identified on the transmission side, only a single bitmap conversion table conformable to the above-described video can be transmitted instead of transmission of the multiple bitmap conversion tables.

In this case, the information indicating, as the target of the bitmap conversion table (CLUT), any of "SDR/Color Gamut 709," "SDR/Color Gamut 2020," and "HDR (HLG or PQ)/Color Gamut 2020" is inserted into the subtitle stream.

Such an insertion method includes, for example, the following methods 1 to 3:

1. the method of transferring the information as the element (because the case of a single CLUT is also included) of the above-described rendering guide segment (RGS: rendering_guide_segment);

2. the method of embedding the "CLUT_type" information in a free space or the display definition segment (DDS: display_definition_segment); and 3. the method of embedding the "CLUT_type" information in a free space of the CLUT definition segment (CDS: CLUT_definition_segment).

Note that instead of inserting the information into the subtitle stream, the method of sharing this information between the transmission side and the receiving side in advance for obtaining conformability is conceivable. In this case, the receiving device holds such shared information in advance in a storage unit (a memory) or a predetermined logic in the control unit 301, for example. Hereinafter, the case of inserting the information into the subtitle stream will be mainly described.

FIG. 34 illustrates a variation of the bitmap conversion table (CLUT) in subtitle transfer. "CLUT_type" indicates the characteristics or the subtitle graphics data after conversion from the bitmap data.

In the illustrated example, the bitmap conversion table (CLUT) with "CLUT_type" of "0" indicates that the dynamic range (dynamic_range) of the target is HDR (HLG) and the color gamut (Color_gamut) of the target is 2020. Moreover, the bitmap conversion table with "CLUT_type" of "1" indicates that the dynamic range of the target is HDR (PQ) and the color gamut of the target is 2020.

Further, the bitmap conversion table with "CLUT_type" of "2" indicates that the dynamic range of the target is SDR and the color gamut of the target is 2020. In addition, the bitmap conversion table with "CLUT_type" of "3" indicates that the dynamic range of the target is SDR and the color gamut of the target is 709.

In a case where the CLUT output is conformable to a final indication on the display, the CLUT output is directly superimposed on the superimposition target video data (the display video data). On the other hand, in a case where the CLUT output is different from the final indication on the display, the color gamut/dynamic range of the CLUT output is, by post processing, converted conformable to the indication on the display, and then, the resultant CLUT output is superimposed on the superimposition target video data (the display video data).

Figure 25:
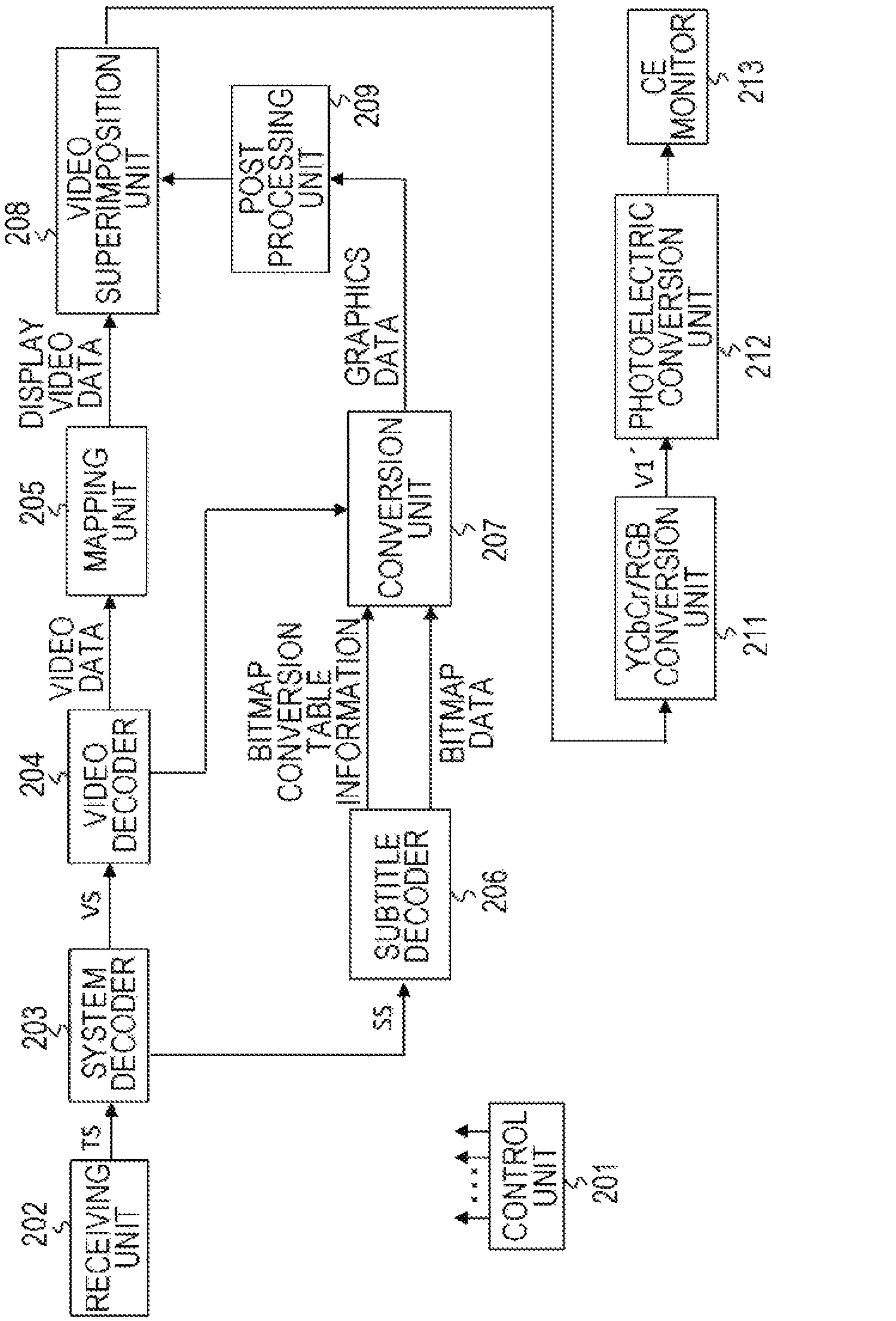
FIG. 25 is a block diagram of another configuration example of the receiving device.

FIG. 25 illustrates a configuration example of a receiving device 200A in the case of transmitting only the single bitmap conversion table. In the receiving device 200A, a post processing unit 209 configured to perform the color gamut or dynamic range conversion processing for the subtitle graphics data obtained by the conversion unit 207 is, if needed, arranged at a subsequent stage of the conversion unit 207. In the receiving device 200, other configurations are similar to those of the receiving device 200 illustrated in FIG. 18. Note that in FIG. 25, the same reference numerals are used to represent units corresponding to those of FIG. 18.

In a case where the CLUT output (the subtitle graphics data) obtained by the conversion unit 207 is conformable to the final indication on the display, the CLUT output is directly superimposed on the superimposition target video data (the display video data) with the post processing unit 209 being ignored. On the other hand, in a case where the CLUT output is different from the final indication on the display, the color gamut/dynamic range of the CLUT output is converted conformable to the indication on the display in the post processing unit 209, and then, the resultant CLUT output is superimposed on the superimposition target video data (the display video data).

"Case 1"

In a case where the output video information of the video decoder 204 is HDR (HLG)/2020 and a case where the superimposition target video data output from the mapping unit 205 is HDR (HLG)/2020 (the display (the CE monitor 213) is compatible with HDR (HLG)/2020), the subtitles need to be displayed with the HDR range. In this case, when the CLUT0 is received, the bitmap data is converted into pixel data with HDR (HLG)/2020 according to the CLUT0 in the conversion unit 207, and then, is transmitted to the video data superimposition unit 202 with the post processing unit 209 being ignored.

On the other hand, when the CLUT 3 is received in this case, the bitmap data is converted into pixel data with SDR/709 according to the CLUT03 in the conversion unit 207. Subsequently, the pixel data is converted into pixel data with HDR (HLG)/2020 in the post processing unit 209, and then, is transmitted to the video data superimposition unit 208.

"Case 2"

In a case where the output video information of the video decoder 204 is HDR (PQ)/2020 and a case where the superimposition target video data output from the mapping unit 205 is SDR/709 (the display (the CE monitor 213) is compatible with SDR/709), the subtitles need to be displayed with the SRD range. In this case, when the CLUT1 is received, the bitmap data is converted into pixel data with HDR (PQ)/2020 according to the CLUT0 in the conversion unit 207. Subsequently, the pixel data is converted into pixel data with SDR/709 in the post processing unit 209, and then, is transmitted to the video data superimposition unit 208.

Figure 26:
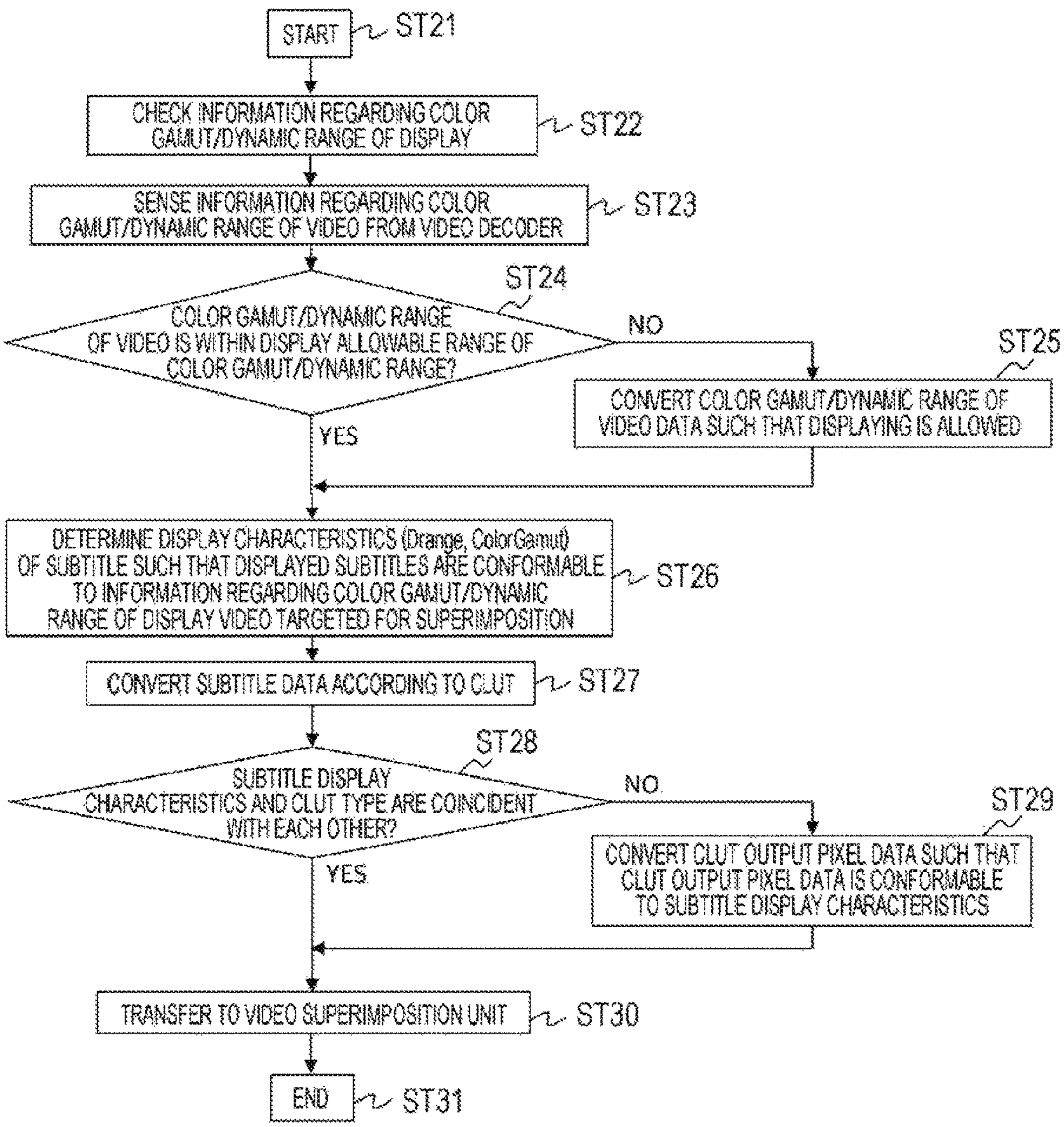
FIG. 26 is a flowchart of an example of a processing flow of a mapping unit, a conversion unit, a post processing unit, and the like under the control of a control unit.

FIG. 26 illustrates an example of a processing flow of the mapping unit 205, the conversion unit 207, the post processing unit 209, the like under the control of the control unit 201. At step ST21, the processing begins. Next, at a step ST22, the information regarding the color gamut/dynamic range of the display (the CE monitor 213) is checked.

Next, at step ST23, the information regarding the color gamut/dynamic range of the video from the video decoder 204 is sensed. Then, at a step ST24, it is determined whether or not the color gamut/dynamic range of the video is within the display allowable range of the color gamut/dynamic range.

When not within the range, the color gamut/dynamic range of the video data is, at a step ST25, converted in the mapping unit 205 such that displaying is allowed, and the resultant video data is taken as the display video data. Note that when within the range, the video data from the video decoder 204 is directly taken as the display video data without conversion of the color gamut/dynamic range of the video data in the mapping unit 205.

Next, at step ST26, the subtitle display characteristics (the dynamic range, the color gamut) are determined such that the displayed subtitles are conformable to the color gamut/dynamic range of the display video targeted for superimposition. Next, at a step ST27, the subtitle data is converted according to the received bitmap conversion table (CLUT) in the conversion unit 207.

Next, at a step ST28, it is determined whether or not the subtitle display characteristics determined at the step ST26 and the type of received bitmap conversion table (CLUT)

are coincident with each other. When not coincident, the CLUT output pixel data from the conversion unit 207 is, at a step ST29, converted conformable to the subtitle display characteristics in the post processing unit 209, and then, is transferred to the video super imposition unit 208 at a step ST30.

On the other hand, when coincident, the CLUT output pixel data from the conversion unit 207 is directly transferred to the video superimposition unit 208 at the step ST30. Then, at a step ST31, the processing ends.

FIG. 27 illustrates a structure example (Syntax) of the display definition segment (DDS) in the case of embedding the "CLUT_type" information in the free space of the display definition segment (DDS), and FIG. 28 illustrates the contents (Semantics) of main information in this structure example. A 2-bit field of "CLUT_type" indicates the dynamic range/color gamut of the pixel after conversion according to the bitmap conversion table (CLUT) transmitted in the CLUT definition segments (CDS).

"00" indicates that the dynamic range is HDR (HLG) and the color gamut is 2020. "01" indicates that the dynamic range is HDR (PQ) and the color gamut is 2020. "10" indicates that the dynamic range is SDR and the color gamut is 2020. "11" indicates that the dynamic range is SDR and the color gamut is 709.

Figure 29:
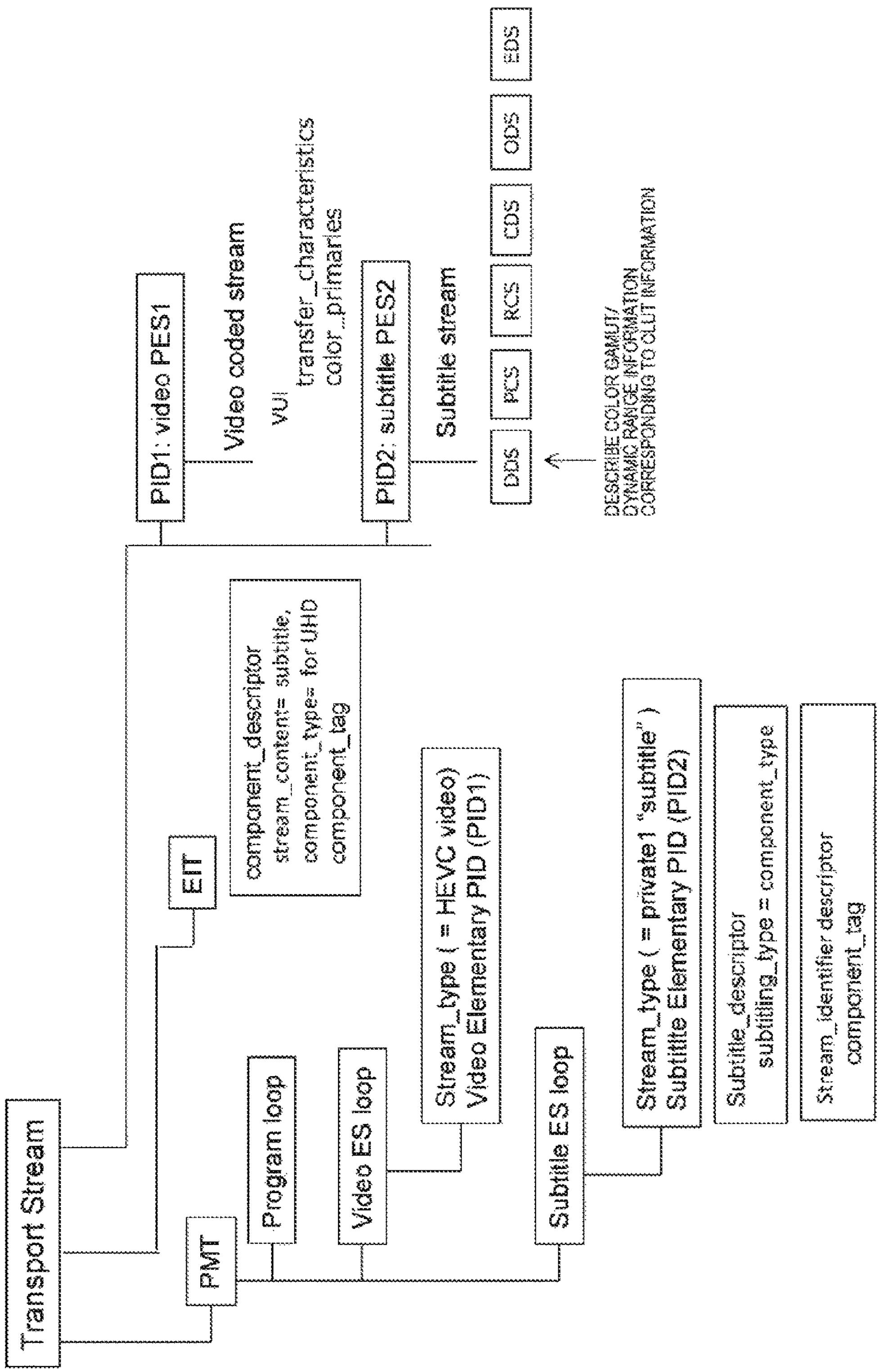
FIG. 29 is a diagram of a configuration example of the transport stream.

FIG. 29 illustrates a configuration example of the transport stream TS in the case of embedding the "CLUT_type" information in the free space of the display definition segment. The typically-known segments such as DDS, PCS, RCS, CDS, ODS, and EDS are inserted into the PES packet of the subtitle stream. The dynamic range/color gamut information corresponding to the CLUT information is described in the display definition segment (DDS). Detailed description will not be made, but other configurations of FIG. 29 are similar to those of FIG. 17.

FIGS. 30 and 31 illustrate a configuration example (Syntax) of the CLUT definition segment (CDS) in the case of embedding the "CLUT_type" information in the free space of the CLUT definition segment (CDS). A 2-bit field of "CLUT_type" indicates the dynamic range/color range of the pixel after conversion according to the bitmap conversion table (CLUT) transmitted in the CLUT definition segment (CDS). This "CLUT_type" is the same as that embedded in the above-described display definition segment (DDS), and therefore, description thereof will not be repeated.

Figure 32:
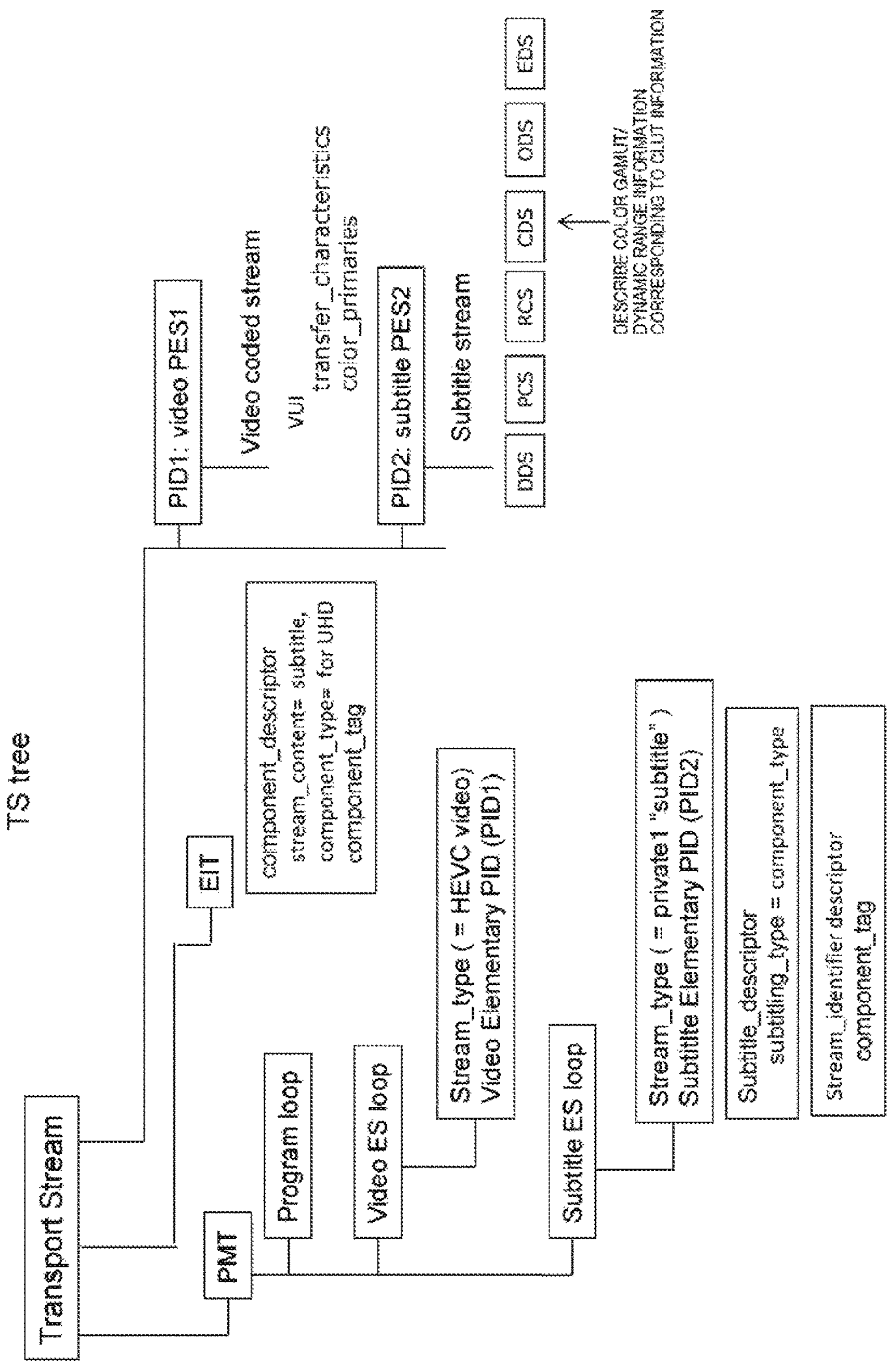
FIG. 32 is a diagram of a configuration example of the transport stream.

FIG. 32 illustrates a configuration example of the transport stream TS in the case of embedding the "CLUT_type" information in the free space of the CLUT definition segment (CDS). The typically-known segments such as DDS, PCS, RCS, CDS, ODS, and EDS are inserted into the PES packet of the subtitle stream. The dynamic range/color gamut information corresponding to the CLUT information is described in the CLUT definition segment (CDS). Detailed description will not be made, but other configurations of FIG. 32 are similar to those of FIG. 17.

Moreover, in the above-described embodiment, the example where the container is the transport stream (MPEG-2 TS) has been described. However, in the present technology, the transport is not limited to TS. Even in the case of other packets such as ISOBMFF and MMT, for example, a video layer can be realized in the same method.

Further, the present technology can employ the following configurations.

(1) A transmission device including:

a video encoding unit configured to generate a video stream with video data;

a subtitle encoding unit configured to generate a subtitle stream with bitmap data obtained by conversion of subtitle graphics data; and a transmission unit configured to transmit a container containing the video stream and the subtitle stream, in which the subtitle stream contains a first segment having a bitmap conversion table with color gamut and/or brightness conversion information.

(2) The transmission device according to (1), in which the first segment is a CLUT definition segment.

(3) The transmission device according to (1) or (2), in which the first segment has multiple bitmap conversion tables different from each other in the conversion information.

(4) The transmission device according to any of (1) to (3), in which the subtitle stream further contains a second segment having bitmap conversion table conformability information.

(5) The transmission device according to (4), in which the conformability information is characteristic information regarding the subtitle graphics data before conversion into the bitmap data and superimposition target video data or characteristic information regarding the subtitle graphics data after conversion from the bitmap data.

(6) The transmission device according to (4) or (5), in which the second segment is a rendering guide segment.

(7) The transmission device according to (4) or (5), in which the second segment is a display definition segment.

(8) The transmission device according to any of (4) to (7), in which identical identification information is added to and associated with each of the bitmap conversion table contained in the first segment and the characteristic information corresponding to the bitmap conversion table and contained in the second segment.

(9) The transmission device according to (1), in which the first segment further has bitmap conversion table conformability information.

(10) The transmission device according to (9), in which the conformability information is characteristic information regarding the subtitle graphics data after conversion from the bitmap data.

(11) A transmission method including:

a video encoding step of generating, by a video encoding unit, a video stream with video data;

a subtitle encoding step of generating, by a subtitle encoding unit, a subtitle stream with bitmap data obtained by conversion of subtitle graphics data; and a transmission step of transmitting, by a transmission unit, a container containing the video stream and the subtitle stream, in which the subtitle stream contains a first segment having a bitmap conversion table with color gamut and/or brightness conversion information.

(12) A receiving device including;

a receiving unit configured to receive a container containing a video stream with video data and a subtitle stream with bitmap data obtained by conversion of subtitle graphics data, in which the subtitle stream contains a first segment having a bitmap conversion table with color gamut and/or brightness conversion information, and a control unit is further provided, the control unit being configured to control processing of decoding the video stream to obtain the video data, processing of decoding the subtitle stream to obtain the bitmap data and the bitmap conversion table, processing of converting the bitmap data into the subtitle graphics by means of the bitmap conversion table, and processing of superimposing the subtitle graphics data on superimposition target video data obtained on the basis of the video data.

(13) The receiving device according to (12), in which the first segment has multiple bitmap conversion tables different from each other in the conversion information, the multiple bitmap conversion tables correspond to multiple different characteristics of the subtitle graphics data before conversion into the bitmap data and the video data, or correspond to multiple different characteristics of the subtitle graphics data after conversion from the bitmap data, and in the processing of converting the bitmap data into the subtitle graphics data, a bitmap conversion table of the multiple bitmap conversion tables conformable to a characteristic of the superimposition target video data is selectively used.

(14) The receiving device according to (13), in which the subtitle stream further contains a second segment having characteristic information corresponding to each of the multiple bitmap conversion tables, and in the processing of converting the bitmap data into the subtitle graphics data, the bitmap conversion table conformable to the characteristic of the superimposition target video data is selected on the basis of the characteristic information contained in the second segment and corresponding to each of the multiple bitmap conversion tables.

(15) The receiving device according to (12), in which the first segment has a single bitmap conversion table, and the control unit further controls post processing of adjusting a characteristic of the subtitle graphics data obtained by conversion according to the bitmap change table to the superimposition target video data when the characteristic is not conformable to the superimposition target video data.

(16) The receiving device according to (12) or (13), in which the first segment has a single bitmap conversion table, and the control unit holds characteristic conformability information regarding the single bitmap conversion table, the characteristic conformability information being shared with a transmission side.

(17) A receiving method including:

a receiving step of receiving, by a receiving unit, a container containing a video stream with video data and a subtitle stream with bitmap data obtained by conversion of subtitle graphics data, in which the subtitle stream contains a first segment having a bitmap conversion table with color gamut and/or brightness conversion information, and a control step is further provided, the control step controlling, by a control unit, processing of decoding the video stream to obtain the video data, processing of decoding the subtitle stream to obtain the bitmap data and the bitmap conversion table, processing of converting the bitmap data into the subtitle graphics data by means of the bitmap conversion table, and processing of superimposing the subtitle graphics data on superimposition target video data obtained on the basis of the video data.

A main feature of the present technology is that the CLUT definition segment contained in the subtitle stream transmitted from the transmission side to the receiving side has the bitmap conversion table containing the color gamut and/or brightness conversion information, and therefore, the bitmap data is, on the receiving side, merely converted into the subtitle graphics data by means of the bitmap conversion table so that the subtitle graphics data with the characteristics conformable to the characteristics of the superimposition target video data can be easily obtained and the processing load on the receiving side can be reduced (see FIGS. 2 and 9 to 10).

REFERENCE SIGNS LIST

10 Transmission/receiving system
100 Transmission device
101 Control unit
102 Video encoder
103 Conversion unit
104 Subtitle encoder
105 System encoder
106 Transmission unit
200, 200A Receiving device
201 Control unit
202 Receiving unit
203 System decoder
204 Video decoder
205 Mapping unit
206 Subtitle decoder
207 Conversion unit
202 Video superimposition unit
200 Post processing unit
211 YCbCr/RGB conversion unit
212 Photoelectric conversion unit
213 CE monitor

The invention claimed is:

1. A transmission device comprising:

processing circuitry configured to generate a video stream with video data;

generate a subtitle stream with bitmap data obtained by conversion of subtitle graphics data; and transmission circuitry configured to transmit a container containing the video stream and the subtitle stream, wherein the subtitle stream contains a first segment that includes a bitmap conversion table with color gamut and/or brightness conversion information, the first segment includes first bitmap conversion table conformability information, and the first bitmap conversion table conformability information is characteristic information regarding the subtitle graphics data after conversion from the bitmap data.

2. The transmission device according to claim 1, wherein the first segment is a CLUT definition segment.

3. The transmission device according to claim 1, wherein the first segment includes multiple bitmap conversion tables with different color gamut and/or brightness conversion information.

4. The transmission device according to claim 1, wherein the subtitle stream further contains a second segment that includes second bitmap conversion table conformability information.

5. The transmission device according to claim 4, wherein the second bitmap conversion table conformability information is characteristic information regarding the subtitle graphics data before conversion into the bitmap data and superimposition target video data or the characteristic information regarding the subtitle graphics data after the conversion from the bitmap data.

6. The transmission device according to claim 4, wherein the second segment is a rendering guide segment.

7. The transmission device according to claim 4, wherein the second segment is a display definition segment.

8. The transmission device according to claim 4, wherein identical identification information is added to and associated with each of the bitmap conversion table contained in the first segment and characteristic information corresponding to the bitmap conversion table and contained in the second segment.

9. A transmission method comprising:

generating, by processing circuitry of a transmission device, a video stream with video data;

generating, by the processing circuitry, a subtitle stream with bitmap data obtained by conversion of subtitle graphics data; and transmitting, by transmission circuitry, a container containing the video stream and the subtitle stream, wherein the subtitle stream contains a first segment that includes a bitmap conversion table with color gamut and/or brightness conversion information, the first segment includes first bitmap conversion table conformability information, and the first bitmap conversion table conformability information is characteristic information regarding the subtitle graphics data after conversion from the bitmap data.

10. A receiving device comprising:

reception circuitry configured to receive a container containing a video stream with video data and a subtitle stream with bitmap data obtained by conversion of subtitle graphics data, the subtitle stream containing a first segment that includes a bitmap conversion table with color gamut and/or brightness conversion information, and processing circuitry configured to control decoding the video stream to obtain the video data, control decoding the subtitle stream to obtain the bitmap data and the bitmap conversion table, control converting the bitmap data into the subtitle graphics data based on the bitmap conversion table, and control superimposing the subtitle graphics data on superimposition target video data obtained based on the video data, wherein the first segment includes bitmap conversion table conformability information, and the bitmap conversion table conformability information is characteristic information regarding the subtitle graphics data after conversion from the bitmap data.

11. The receiving device according to claim 10, wherein the first segment includes multiple bitmap conversion tables with different color gamut and/or brightness conversion information, the multiple bitmap conversion tables correspond to multiple different characteristics of the subtitle graphics data before conversion into the bitmap data and the video data, or correspond to multiple different characteristics of the subtitle graphics data after the conversion from the bitmap data, and in the conversion of the bitmap data into the subtitle graphics data, a selected bitmap conversion table of the multiple bitmap conversion tables conformable to a characteristic of the superimposition target video data is selectively used.

12. The receiving device according to claim 11, wherein the subtitle stream further contains a second segment that includes characteristic information corresponding to each of the multiple bitmap conversion tables, and in the conversion of the bitmap data into the subtitle graphics data, the selected bitmap conversion table conformable to the characteristic of the superimposition target video data is selected based on the characteristic information contained in the second segment and corresponding to each of the multiple bitmap conversion tables.

13. The receiving device according to claim 10, wherein the first segment has a single bitmap conversion table, and the processing circuitry further controls post processing of adjusting a characteristic of the subtitle graphics data obtained by the conversion according to the bitmap change table to the superimposition target video data when the characteristic is not conformable to the superimposition target video data.

14. The receiving device according to claim 10, wherein the first segment has a single bitmap conversion table, and the processing circuitry holds characteristic conformability information regarding the single bitmap conversion table, the characteristic conformability information being shared with a transmission side.

15. A receiving method comprising:

of receiving, by reception circuitry, a container containing a video stream with video data and a subtitle stream with bitmap data obtained by conversion of subtitle graphics data, the subtitle stream containing a first segment that includes a bitmap conversion table with color gamut and/or brightness conversion information, and controlling, by processing circuitry of a receiving device, decoding the video stream to obtain the video data, decoding the subtitle stream to obtain the bitmap data and the bitmap conversion table, converting the bitmap data into the subtitle graphics data based on the bitmap conversion table, and superimposing the subtitle graphics data on superimposition target video data obtained based on the video data, wherein the first segment includes bitmap conversion table conformability information, and the bitmap conversion table conformability information is characteristic information regarding the subtitle graphics data after conversion from the bitmap data.

* * * * *